US009928501B1

(12) United States Patent
Edwards

(10) Patent No.: US 9,928,501 B1
(45) Date of Patent: Mar. 27, 2018

(54) SECURE PASSCODE ENTRY DOCKING STATION

(71) Applicant: Square, Inc., San Francisco, CA (US)

(72) Inventor: Troy J. Edwards, Los Gatos, CA (US)

(73) Assignee: SQUARE, INC., San Francisco, CA (US)

(*) Notice: Subject to any disclaimer, the term of this patent is extended or adjusted under 35 U.S.C. 154(b) by 487 days.

(21) Appl. No.: 14/105,006

(22) Filed: Dec. 12, 2013

Related U.S. Application Data

(60) Provisional application No. 61/888,968, filed on Oct. 9, 2013.

(51) Int. Cl.
G06Q 20/32 (2012.01)
G06F 3/0488 (2013.01)
G06Q 20/40 (2012.01)

(52) U.S. Cl.
CPC ..... *G06Q 20/3226* (2013.01); *G06F 3/04886* (2013.01); *G06Q 20/4012* (2013.01)

(58) Field of Classification Search
CPC .................................................. G06Q 20/4012
See application file for complete search history.

(56) References Cited

U.S. PATENT DOCUMENTS

| 5,815,083 A | 9/1998 | Patarin et al. |
| 5,903,652 A | 5/1999 | Mital |
| 5,949,348 A | 9/1999 | Kapp et al. |
| 5,970,146 A | 10/1999 | McCall et al. |
| 6,257,486 B1 | 7/2001 | Teicher et al. |
| 6,434,702 B1 * | 8/2002 | Maddalozzo, Jr. ... G06F 3/0238 382/115 |
| 6,549,194 B1 * | 4/2003 | McIntyre ............ G06F 21/6218 340/5.4 |
| 6,925,169 B2 | 8/2005 | Habu |
| 7,058,613 B1 | 6/2006 | Sato et al. |
| 7,096,256 B1 | 8/2006 | Shafer |
| 7,333,602 B2 | 2/2008 | Habu |
| 7,596,701 B2 | 9/2009 | Varghese et al. |

(Continued)

FOREIGN PATENT DOCUMENTS

| CA | 2 919 655 A1 | 2/2015 |
| CA | 2 925 747 A1 | 4/2015 |

(Continued)

OTHER PUBLICATIONS

Zezschwitz, E V., et al., "Making Graphic-Based Authentication Secure against Smudge Attacks," Session: Emotion and User Modeling, IUI'13, dated Mar. 19-23, 2013, pp. 277-286.

(Continued)

*Primary Examiner* — Narayanswamy Subramanian
*Assistant Examiner* — Christopher Bridges
(74) *Attorney, Agent, or Firm* — Mattingly & Malur, PC

(57) ABSTRACT

A docking station to couple with a mobile device is disclosed. The docking station, in one embodiment, includes: a frame configured to detachably hold a mobile device; a connector configured to communicate with the mobile device when the mobile device is held by the frame; and a dial configured to change a character selection on a virtual character selection reel for composing a passcode entry; wherein the connector is configured to send a command to change the character selection to the mobile device.

13 Claims, 20 Drawing Sheets

(56) References Cited

U.S. PATENT DOCUMENTS

| | | | |
|---|---|---|---|
| 7,641,111 B2 | 1/2010 | Adams et al. | |
| 7,698,563 B2* | 4/2010 | Shin | G06F 21/36 713/184 |
| 7,705,829 B1 | 4/2010 | Plotnikov | |
| 8,254,579 B1 | 8/2012 | Morgan et al. | |
| 8,281,998 B2* | 10/2012 | Tang | G06Q 20/32 235/380 |
| 8,392,846 B2* | 3/2013 | Carapelli | G06Q 20/206 345/173 |
| 8,613,070 B1 | 12/2013 | Borzycki et al. | |
| 8,700,895 B1 | 4/2014 | Naguib | |
| 8,978,975 B2 | 3/2015 | Barnett | |
| 9,141,977 B2 | 9/2015 | Davis et al. | |
| 9,229,549 B1 | 1/2016 | Lee | |
| 2002/0066039 A1 | 5/2002 | Dent | |
| 2002/0188872 A1* | 12/2002 | Willeby | G06F 3/04886 726/7 |
| 2002/0196274 A1 | 12/2002 | Comfort et al. | |
| 2003/0182558 A1* | 9/2003 | Lazzaro | G06Q 30/0641 713/183 |
| 2004/0096188 A1 | 5/2004 | Kageyama | |
| 2004/0139340 A1 | 7/2004 | Johnson et al. | |
| 2005/0193208 A1 | 9/2005 | Charrette, III et al. | |
| 2005/0195170 A1 | 9/2005 | Habu | |
| 2005/0212763 A1 | 9/2005 | Okamura | |
| 2005/0250538 A1 | 11/2005 | Narasimhan et al. | |
| 2005/0251451 A1 | 11/2005 | Tan et al. | |
| 2005/0256742 A1 | 11/2005 | Kohan et al. | |
| 2006/0053301 A1 | 3/2006 | Shin | |
| 2006/0165060 A1 | 7/2006 | Dua | |
| 2006/0218397 A1 | 9/2006 | Brown et al. | |
| 2006/0224523 A1* | 10/2006 | Elvitigala | G06F 3/04886 705/64 |
| 2007/0089164 A1 | 4/2007 | Gao et al. | |
| 2007/0096946 A1* | 5/2007 | Kim | G09C 1/00 341/22 |
| 2007/0118736 A1 | 5/2007 | Huque | |
| 2007/0168674 A1 | 7/2007 | Nonaka et al. | |
| 2007/0241180 A1 | 10/2007 | Park et al. | |
| 2007/0250920 A1 | 10/2007 | Lindsay | |
| 2008/0017711 A1 | 1/2008 | Adams et al. | |
| 2008/0091944 A1 | 4/2008 | vo Mueller et al. | |
| 2008/0098464 A1 | 4/2008 | Mizrah | |
| 2008/0148186 A1 | 6/2008 | Krishnamurthy | |
| 2008/0165151 A1 | 7/2008 | Lemay et al. | |
| 2008/0189214 A1 | 8/2008 | Mueller et al. | |
| 2008/0244714 A1 | 10/2008 | Kulakowski et al. | |
| 2009/0066543 A1 | 3/2009 | Delia et al. | |
| 2009/0172810 A1 | 7/2009 | Won et al. | |
| 2009/0237361 A1 | 9/2009 | Mosby | |
| 2009/0265776 A1 | 10/2009 | Baentsch et al. | |
| 2009/0271276 A1 | 10/2009 | Roberts | |
| 2009/0307768 A1 | 12/2009 | Zhang et al. | |
| 2010/0024018 A1 | 1/2010 | Koziol et al. | |
| 2010/0109920 A1 | 5/2010 | Spradling | |
| 2010/0127987 A1 | 5/2010 | Liu | |
| 2010/0138666 A1 | 6/2010 | Adams et al. | |
| 2010/0153273 A1 | 6/2010 | Sellars et al. | |
| 2011/0007008 A1 | 1/2011 | Algreatly | |
| 2011/0071949 A1* | 3/2011 | Petrov | G06Q 20/10 705/72 |
| 2011/0084131 A1 | 4/2011 | McKelvey | |
| 2011/0090097 A1 | 4/2011 | Beshke | |
| 2011/0185319 A1 | 7/2011 | Carapelli | |
| 2011/0204140 A1 | 8/2011 | Hart et al. | |
| 2011/0219459 A1 | 9/2011 | Andreasson | |
| 2012/0047564 A1 | 2/2012 | Liu | |
| 2012/0054401 A1* | 3/2012 | Cheng | G06F 1/1632 710/304 |
| 2012/0084206 A1 | 4/2012 | Mehew et al. | |
| 2012/0084480 A1* | 4/2012 | Reeves | G06F 13/14 710/303 |
| 2012/0093313 A1 | 4/2012 | Michiels | |
| 2012/0095914 A1 | 4/2012 | McKelvey et al. | |
| 2012/0130903 A1 | 5/2012 | Dorsey et al. | |
| 2012/0162124 A1 | 6/2012 | Lin | |
| 2012/0174215 A1 | 7/2012 | Steeves | |
| 2012/0174233 A1 | 7/2012 | Waterson | |
| 2012/0265981 A1 | 10/2012 | Moon et al. | |
| 2012/0268393 A1 | 10/2012 | Lee | |
| 2012/0272059 A1 | 10/2012 | Shetty et al. | |
| 2012/0284194 A1 | 11/2012 | Liu et al. | |
| 2012/0287064 A1 | 11/2012 | Kunori | |
| 2012/0303960 A1 | 11/2012 | Wankmueller et al. | |
| 2013/0046697 A1 | 2/2013 | Schibuk | |
| 2013/0047237 A1 | 2/2013 | Ahn et al. | |
| 2013/0085941 A1 | 4/2013 | Rosenblatt et al. | |
| 2013/0109371 A1* | 5/2013 | Brogan | G06F 1/1626 455/420 |
| 2013/0119130 A1 | 5/2013 | Braams | |
| 2013/0144792 A1 | 6/2013 | Nilsson et al. | |
| 2013/0171967 A1 | 7/2013 | Ashour et al. | |
| 2013/0185167 A1 | 7/2013 | Mestre et al. | |
| 2013/0239187 A1 | 9/2013 | Leddy et al. | |
| 2013/0246272 A1 | 9/2013 | Kirsch | |
| 2013/0262248 A1* | 10/2013 | Kim | G07G 1/0018 705/17 |
| 2013/0301830 A1 | 11/2013 | Bar-El et al. | |
| 2013/0305392 A1* | 11/2013 | Bar-El | H04L 9/08 726/29 |
| 2013/0328801 A1 | 12/2013 | Quigley et al. | |
| 2013/0332360 A1 | 12/2013 | Quigley et al. | |
| 2013/0332367 A1 | 12/2013 | Quigley et al. | |
| 2013/0333007 A1 | 12/2013 | Chougle et al. | |
| 2013/0333011 A1 | 12/2013 | Quigley et al. | |
| 2014/0020117 A1 | 1/2014 | Nagai et al. | |
| 2014/0025579 A1 | 1/2014 | Nilsson | |
| 2014/0057621 A1* | 2/2014 | Ji | H04M 1/72527 455/419 |
| 2014/0096201 A1* | 4/2014 | Gupta | H04W 12/06 726/4 |
| 2014/0324708 A1 | 10/2014 | McCauley et al. | |
| 2015/0249662 A1 | 9/2015 | Iwanski et al. | |
| 2016/0150411 A1 | 5/2016 | Liu et al. | |
| 2016/0275515 A1 | 9/2016 | Quigley et al. | |
| 2017/0169428 A1 | 6/2017 | Edwards | |

FOREIGN PATENT DOCUMENTS

| | | |
|---|---|---|
| CA | 2 925 903 A1 | 4/2015 |
| DE | 10 2007 018 802 B3 | 8/2008 |
| EP | 1 710 948 A1 | 10/2006 |
| EP | 1 770 575 A1 | 4/2007 |
| EP | 1 806 653 A1 | 7/2007 |
| EP | 2 141 647 A1 | 1/2010 |
| EP | 2 207 124 A2 | 7/2010 |
| FR | 2 693 815 A1 | 1/1994 |
| GB | 2 373 616 A | 9/2002 |
| JP | 2000-305899 A | 11/2000 |
| JP | 2002-074508 A | 3/2002 |
| JP | 2004-102460 A | 4/2004 |
| JP | 2007-86873 A | 4/2007 |
| JP | 2008-065365 A | 3/2008 |
| JP | 2012-530269 A | 11/2012 |
| JP | 2013-507720 A | 3/2013 |
| JP | 2015-501100 A | 1/2015 |
| KR | 2001-0056090 A | 7/2001 |
| KR | 10-2010-0047097 A | 5/2010 |
| KR | 10-1228088 B1 | 2/2013 |
| KR | 10-1228090 B1 | 2/2013 |
| WO | 98/12615 A2 | 3/1998 |
| WO | 2010/024923 A1 | 3/2010 |
| WO | 2010/097711 A2 | 9/2010 |
| WO | 2011/093998 A1 | 8/2011 |
| WO | 2011/136464 A1 | 11/2011 |
| WO | 2012/122175 A1 | 9/2012 |
| WO | 2013/081589 A1 | 6/2013 |
| WO | 2013/089717 A1 | 6/2013 |
| WO | 2013/188599 A2 | 12/2013 |
| WO | 2015/017130 A1 | 2/2015 |
| WO | 2015/048040 A1 | 4/2015 |
| WO | 2015/048041 A1 | 4/2015 |

(56) References Cited

FOREIGN PATENT DOCUMENTS

OTHER PUBLICATIONS

Advisory Action dated Jan. 22, 2016, for U.S. Appl. No. 13/800,920, of Quigley, O.S.C., et al., filed Mar. 13, 2013.
Final Office Action dated Feb. 4, 2016, for U.S. Appl. No. 13/799,724, of Quigley, O.S.C., et al., filed Mar. 13, 2013.
Notice of Allowance dated Mar. 11, 2016, for U.S. Appl. No. 13/800,920, of Quigley, O.S.C., filed Mar. 13, 2013.
Notice of Allowance dated Mar. 23, 2016, for U.S. Appl. No. 13/800,789, of Quigley, O.S.C., filed Mar. 13, 2013.
Non-Final Office Action dated Mar. 24, 2016, for U.S. Appl. No. 14/041,863, of Edwards, T.J., filed Sep. 30, 2013.
Non-Final Office Action dated Mar. 24, 2016, for U.S. Appl. No. 14/050,233, of Edwards, T.J., filed Oct. 9, 2013.
Non-Final Office Action dated Apr. 18, 2016, for U.S. Appl. No. 14/050,216, of Edwards, T.J., filed Oct. 9, 2013.
Notice of Allowance dated Oct. 3, 2016, for U.S. Appl. No. 14/041,863, of Edwards, T.J., filed Sep. 30, 2013.
Final Office Action dated Oct. 4, 2016, for U.S. Appl. No. 14/050,233, of Edwards, T.J., filed Oct. 9, 2013.
Advisory Action dated Oct. 4, 2016, for U.S. Appl. No. 14/696,235, of Quigley, O.S.C., et al., filed Apr. 24, 2015.
Final Office Action dated Jun. 17, 2016, for U.S. Appl. No. 14/696,235, of Quigley, O.S.C., et al., filed Apr. 24, 2015.
Final Office Action dated Apr. 22, 2016, for U.S. Appl. No. 13/800,610, of Quigley, O.S.C., et al., filed Mar. 13, 2013.
Park, Y.S., and Han, S.H., "Touch key design for one-handed thumb interaction with a mobile phone: Effects of touch key size and touch key location," International Journal of Industrial Ergonomics, vol. 40, Issue 1, pp. 68-76 (Jan. 1, 2010).
Non-Final Office Action dated Nov. 3, 2016, for U.S. Appl. No. 14/026,187, of McCauley, N., filed Sep. 13, 2013.
Non-Final Office Action dated Nov. 18, 2016, for U.S. Appl. No. 15/169,260, of Quigley, O.S.C. et al., filed May 31, 2016.
Notice of Allowance dated Nov. 23, 2016, for U.S. Appl. No. 14/050,216, of Edwards, T.J. filed Oct. 9, 2013.
Advisory Action dated Dec. 20, 2016, for U.S. Appl. No. 14/050,233, of Edwards, T.J., filed Oct. 9, 2013.
Non Final Office Action dated Jan. 13, 2017, for U.S. Appl. No. 14/696,235, of Quigley, O.S.C., et al., filed Apr. 24, 2015.
Examiner Requisition for Canadian Patent Application No. 2,925,747, dated Jan. 19, 2017.
Examiner Requisition for Canadian Patent Application No. 2,925,903, dated Feb. 3, 2017.
Non Final Office Action dated Feb. 10, 2017, for U.S. Appl. No. 14/055,838, of McCauley, N.P., et al., filed Oct. 16, 2013.
Non Final Office Action dated Feb. 24, 2017, for U.S. Appl. No. 14/050,233, of Edwards, T.J., filed Oct. 9, 2013.
Non Final Office Action dated Mar. 14, 2017, for U.S. Appl. No. 13/800,610, of Quigley, O.S.C., et al., filed Mar. 13, 2013.
Intention to Grant for European Patent Application No. 13734545.0, dated Mar. 9, 2017.
Examination Report No. 1 for Australian Patent Application No. 2014327030, dated Dec. 2, 2016.
Examination Report No. 1 for Australian Patent Application No. 2014327031, dated Dec. 7, 2016.
Examination Report No. 1 for Australian Patent Application No. 2014296635, dated Feb. 13, 2017.
Extended European Search Report for European Patent Application No. 14832098.9, dated Dec. 14, 2016.
Extended European Search Report for European Patent Application No. 14848803.4, dated Feb. 3, 2017.
Extended European Search Report for European Patent Application No. 14848354.8, dated Feb. 3, 2017.
Intention to Grant for European Patent Application No. 13734545.0, dated Aug. 17, 2017.
Final Office Action dated Aug. 21, 2017, for U.S. Appl. No. 14/055,838, of McCauley, N.P., et al., filed Oct. 16, 2013.

International Search Report and Written Opinion dated Jan. 12, 2015 for International Patent Application No. PCT/US2014/057050, filed Sep. 23, 2014.
International Search Report and Written Opinion dated Jan. 12, 2015 for International Patent Application No. PCT/US2014/057047, filed Sep. 23, 2014.
English-language translation of Search Report for Japanese Patent Application No. 2016-531736, dated Apr. 27, 2017.
English-language translation of Notification of Reasons for Refusal for Japanese Patent Application No. 2016-531736, dated May 26, 2017.
Notice of Allowance dated May 30, 2017, for U.S. Appl. No. 14/026,187, of McCauley, N., filed Sep. 13, 2013.
Notice of Acceptance for Australian Patent Application No. 2014327030, dated Jun. 14, 2017.
Final Office Action dated Jun. 26, 2017, for U.S. Appl. No. 15/169,260, of Quigley, O.S.C., et al., filed May 31, 2016.
Non Final Office Action dated Jul. 14, 2017, for U.S. Appl. No. 14/696,235, of Quigley, O.S.C., et al., filed Apr. 24, 2015.
"A Guide to EMV—Version 1.0 (presentation)," EMVCo, dated May 2011, pp. 1-39.
"A Guide to EMV—Version 1.0," EMVCo LLC, dated May 2011, pp. 1-35.
"EMV Essentials for US Credit Unions," A Mercator Advisory Group Research Brief Sponsored by CSCU, dated Mar. 22, 2012, pp. 1-15.
"MasterCard PayPass, Terminal Implementation Requirements," Mastercard Worldwide, 2007 v.1, on Sep. 10, 2015, pp. 1-62.
Fillmore, P., "Mobile and Contactless Payment and Security," v20111118, Witham Laboratories, on Nov. 18, 2011, pp. 1-39.
Non-Final Office Action dated Oct. 1, 2015, for U.S. Appl. No. 13/800,610, of Quigley, O.S.C., et al., filed Mar. 13, 2013.
Non-Final Office Action dated Oct. 1, 2015, for U.S. Appl. No. 13/799,724, of Quigley, O.S.C., et al., filed Mar. 13, 2013.
Non-Final Office Action dated Oct. 7, 2015, for U.S. Appl. No. 13/800,789, of Quigley, O.S.C., et al., filed Mar. 13, 2013.
Final Office Action dated Oct. 21, 2015, for U.S. Appl. No. 13/800,920, of Quigley, O.S.C., et al., filed Mar. 13, 2013.
Non-Final Office Action dated Nov. 4, 2015, for U.S. Appl. No. 14/696,235, of Quigley, O.S.C., et al., filed Apr. 24, 2015.
U.S. Appl. No. 14/026,187, of McCauley, N., filed Sep. 13, 2013.
U.S. Appl. No. 14/696,235, of Quigley, O.S.C, et al., filed Apr. 24, 2015.
International Search Report and Written Opinion dated Dec. 12, 2013, for International Patent Application No. PCT/US2013/045523, filed Jun. 12, 2013.
International Search Report and Written Opinion dated Oct. 31, 2014, for International Patent Application No. PCT/US2014/046923, filed Jul. 16, 2014.
Non-Final Office Action dated Aug. 12, 2014, for U.S. Appl. No. 13/800,920, of Quigley, O.S.C., et al., filed Mar. 13, 2013.
Final Office Action dated Feb. 18, 2015, for U.S. Appl. No. 13/800,920, of Quigley, O.S.C., et al., filed Mar. 13, 2013.
Non-Final Office Action dated May 21, 2015, for U.S. Appl. No. 13/800,920, of Quigley, O.S.C., et al., filed Mar. 13, 2013.
"Security Requirements for Cryptographic Modules," National Institute of Standards and Technology, FIPS PUB 140-1, on Jan. 11, 1994, pp. 1-69.
Denning, E.D., "Field Encryption and Authentication", Advances in Cryptology: Proceedings of Crypto, pp. 1-17 (1983).
Denning, R.E.D., "Cryptography and Data Security," Purdue University (1982), pp. 1-199 [Part-1].
Denning, R.E.D., "Cryptography and Data Security," Purdue University (1982), pp. 200-209 [Part-2].
Koch, H.S., et al., "The application of cryptography for data base security," AFIPS National Computer Conference, dated Jun. 7-10, 1976, pp. 97-107.
Co-Pending U.S. Appl. No. 14/041,863 by Edwards, T.J., filed Sep. 30, 2013.
Co-Pending U.S. Appl. No. 14/050,216 by Edwards, T.J., filed Oct. 9, 2013.
Co-Pending U.S. Appl. No. 14/050,233 by Aaron, P. et al., filed Oct. 9, 2013.

(56) References Cited

OTHER PUBLICATIONS

"Bluetooth," Wikipedia, dated Jun. 10, 2012, Retrieved from the Internet URL: https://en.wikipedia.org/w/index.php?title=Bluetooth&oldid=496913037, on Nov. 24, 2017, pp. 1-22.
Notice of Acceptance for Australian Patent Application No. 2014327031, dated Dec. 4, 2017.
Extended European Search Report for European Patent Application No. 17193013.4, dated Dec. 4, 2017.
Final Office Action dated Nov. 15, 2017, for U.S. Appl. No. 13/800,610, of Quigley, O.S.C., et al., filed Mar. 13, 2013.
Non-Final Office Action dated Dec. 20, 2017, for U.S. Appl. No. 14/055,838, of McCauley, N. P., et al., filed Oct. 16, 2013.

\* cited by examiner

SECURE PASSCODE ENTRY DOCKING STATION

CROSS-RELATED APPLICATIONS

This is a non-provisional application filed under 37 C.F.R. § 1.53(b), claiming priority under U.S.C. Section 119(e) to U.S. Provisional Patent Application Ser. No. 61/888,968 filed Oct. 9, 2013, the entire disclosure of which is hereby expressly incorporated by reference in its entirety.

BACKGROUND

Security in accessing and transmitting information is as crucial as security to protect physical possessions. Conventional security devices, such as combination locks, may include devices that control access based on possession of a virtual "key," such as in the form of private information (e.g., a passcode). A passcode is a combination of a sequence of characters, such as letters, numbers, special characters, or any combination thereof. In the digital realm, passcode-based locks are emulated by digital passcode-based security devices, such as a key pad on an automatic teller machine (ATM) or a card reader for a debit card personal identification number (PIN) key pad. These digital passcode-based security devices are generally special-purpose hardware devices (i.e., lacking a general purpose operating system/kernel to run different functional components) that control access to a system based on a user's knowledge of a passcode. Conventional digital passcode-based security devices are implemented on special-purpose devices because of the ability to build concealment structures, such as a shield wall around the PIN key pad, around the special-purpose devices. Further, conventional digital passcode-based security devices are implemented on special-purpose devices because, among other reasons, any general-purpose device may be more vulnerable to installation of malware (i.e., software designed to overcome security without authorization).

For example, in a conventional transaction where payment is made by using a point-of-sale electronic payment card (e.g., a debit card or smart card such as a Europay, MasterCard, and Visa (EMV) card), a cardholder's identity and/or authenticity is confirmed by requiring the cardholder ("user") to enter a PIN rather than or in addition to signing a paper receipt. A user may enter a PIN entry on a PIN pad on a special-purpose card reader, on which a protective shield may partially surround the PIN pad. The card reader then retrieves an authentic PIN from the smart card. The user-entered PIN is compared against the authentic PIN from the smart card. Authorization of the use of the card is then granted when the user PIN entry matches the authentic PIN.

The example above involves using a special-purpose device to authorize a user, instead of using a general-purpose device, i.e., a device that has an operating system enabling any third party software application to run on it. A general-purpose device enables ease of implementation of security sensitive applications. For example, general-purpose devices may include personal computers, smart phones (e.g., Android phone or iPhone), or tablet computers (e.g., iPad, Kindle, Galaxy Tab, etc.). The ability to use general-purpose devices to implement a passcode-based authentication system enables merchants and consumers who wish to use or implement a secured authentication system to use devices they already own for that purpose. General-purpose devices also enable a wider selection of presentation capabilities, and thus enabling integration of a storefront with a payment authentication system.

Figure 1:
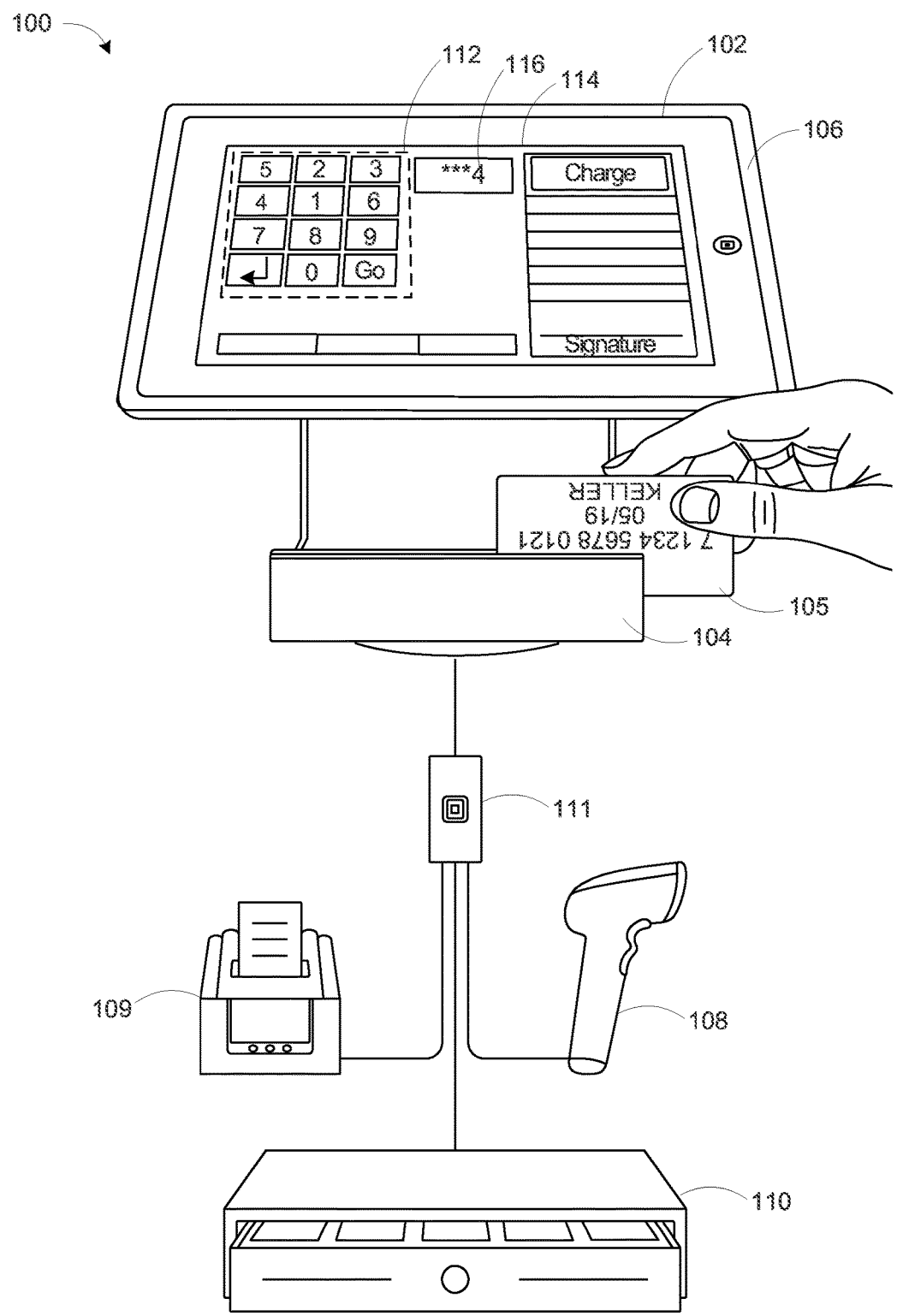
FIG. 1 is a system architecture diagram of a payment system illustrating a general-purpose electronic device for secured passcode entry.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Disclosed herein is a technique for secure passcode entry on a user interface of a general-purpose electronic device; the portion of the user interface used for passcode entry is henceforth referred to as the "passcode entry interface" in this description. Making a card reader part of the general-purpose electronic device may previously have been unfeasible because of the difficulty of defending against installation of malware on the same general-purpose device and the infeasibility of installing concealment structures around the general-purpose device. The disclosed technique includes mechanisms to conceal a user's passcode entry from unauthorized individuals attempting to discover the passcode (e.g., by looking over the shoulder of the user or by analyzing positions of fingerprints on a touchscreen of the electronic device). For example, the disclosed technique includes scrambling character labels on the passcode entry interface such that a character entry cannot be interpreted via just a glance. The disclosed technique is advantageous by enabling a general purpose device with a touchscreen to be used securely for passcode authentication. The concealment mechanisms are designed such that the general purpose device may be part of a payment system and satisfy the security requirements of the payment system.

In various embodiments, a passcode entry interface is generated on a touchscreen of the general-purpose electronic device. The general-purpose electronic device may be, for example, a mobile device, such as a tablet computer, a smart phone, or an e-reader, or stationary devices, such as personal computers or I/O terminals. The passcode entry interface may include a character entry mechanism, where a passcode entry comprises a sequence of character entries by the user. In some embodiments, the general-purpose device is coupled to a docking station. The passcode entry interface may be partially displayed on a display of the docking station. The docking station may include one or more control mechanisms for interacting with the passcode entry interface.

In various embodiments, the disclosed technique involves arranging soft buttons (displayed images or icons of buttons on a touch-sensitive display device) on the passcode entry interface in an out-of-sequence manner, where the soft buttons (hereinafter simply "buttons") correspond to character options for composing a passcode entry. The buttons may be of any shape, such as a square, a circle, or a hexagon, any single or mix of colors, and any size. For example, the buttons may be arranged randomly on the passcode entry interface. In some embodiments, the buttons are rearranged in response to a touch event on the touchscreen. The rearrangement may be on a random basis, where fixed button positions are assigned a random character from the character options for composing the passcode entry. For example, an initial passcode entry interface may be arranged out of sequence from a natural sequence of the character options (e.g., a numeric sequence or an alphabetical sequence). For another example, a subsequent passcode character entry (e.g., entry of a number of a PIN) may trigger rearranging of the buttons on the passcode entry interface. This mechanism helps to confuse any potential wrongdoer who may be looking over a user's shoulders while the user is entering the passcode entry.

In some embodiments, the passcode entry technique involves positioning the passcode entry interface at a corner of the touchscreen. This positioning enables a user to better shield the passcode entry interface with his/her hand while entering the passcode on the touchscreen.

In some embodiments, the passcode entry interface is shaped in a loop pattern as displayed on the touchscreen. A loop pattern is arranged such that buttons on the passcode entry interface follows a curve that is connected to its beginning. For example, the loop pattern can be a substantially circular pattern, a substantially elliptical pattern, a hexagonal pattern, a star pattern, etc. For example, the passcode entry interface may be shaped as a ring. The buttons corresponding to the character options for composing the passcode entry may be evenly spaced along the ring. The buttons corresponding to the character options may be arranged in sequence (e.g., numeric or alphabetic sequence), but the initial arrangement of the buttons may be according to a random rotation of the buttons around a center of the loop pattern shape. In some embodiments, each character entry based on a touch event on one of the buttons triggers a rearrangement of the buttons on the loop pattern shape, such as a new rotation of the buttons around the center of the loop pattern shape.

In various embodiments, a character entry is triggered by detection of a dialing gesture over the loop pattern passcode entry interface. The electronic device may detect a dialing gesture over the passcode entry interface, where buttons on the loop pattern passcode entry interface rotate in response to the dialing gesture. A fixed position along the loop pattern interface may be designated as a selection juncture, where after the dialing gesture, the character at the selection juncture is entered as part of the passcode entry, similar to operation of a rotary dial phone.

The loop pattern interface may include an even number of characters. When there is an even number of characters on the loop pattern passcode entry interface, relative positions between pairs of the buttons remain the same after randomized rotations of the buttons around the center of the loop pattern. Hence, the loop pattern interface is advantageous by allowing a semi-random arrangement of characters on the interface while maintaining a radial symmetry enabling users to quickly find the characters options for composing the passcode entry.

In various embodiments, touch events (e.g., X and Y coordinates of where each touch happens on the touchscreen) over the buttons on the touchscreen are encrypted. Configurations of display instances of the passcode entry interface may vary between each touch event, between each user session, or between other time intervals. For example, configuration of a display instance can include the geometry, position, and/or arrangement of the buttons. The configuration of the display instance can be stored on the electronic device or remotely on an external server system. Together, the configuration of the displaced instance and the encrypted coordinates of the touch events during a time duration of the display instance can be used to determine the passcode entry by the user.

In various embodiments, the concealment mechanism includes ways of making it difficult to interpret characters on the passcode entry interface by a quick glance. For example, the electronic device can overlay a concealment layer over the passcode entry interface. The concealment layer may include random blots, line segments (e.g., straight, curved or wavy), spots, stains, blemishes, or other low density geometries to make it difficult for interpretation of the character labels on the buttons at a distance while convenient enough for interpretation by a close up look. As another example, the characters displayed on the buttons can include variations of stroke widths to achieve the same result. Different stroke widths on the characters tends to confuse a potential wrongdoer from interpreting the passcode entry by a quick glance. In other embodiments, a line moiré pattern slides over the passcode entry interface with character labels patterned to be revealed or concealed by the line moiré pattern. The sliding of the line moiré pattern obfuscates the characters on the buttons in a way such that only certain numbers can be visible at any given time.

In various embodiments, the passcode entry interface is displayed and presented as a selection reel/tumbler instead of a keypad. One or more selection reels may be displayed on the passcode entry interface. The selection reel may be displayed on the touchscreen. As an example, a swiping gesture on the touchscreen over the selection reel may enable switching of a selection from among character options for composing a passcode entry. As another example, a dial element may be displayed on the touchscreen, where a dialing gesture around the dial element enable switching among characters options for composing a passcode entry. As yet another example, a hardware dial may be part of the docking station coupled to the general-purpose electronic device. The hardware dial may detect a turning motion thereon and command a switch to select a character from among characters options for composing a passcode entry.

The selection reel may be displayed on the touchscreen of the general-purpose electronic device or a display on the docking station. For example, the display on the docking station may be within the hardware dial or at another portion of the docking station. A polarized screen may be placed over the touchscreen of the general-purpose electronic device or the display on the docking station. The polarized screen helps to prevent the passcode entry from being visible to someone looking over the shoulder of the user.

Once toggled to the desired character, the user may select a character on the selection reel. For example, a touch event on a button on the touchscreen can trigger the selection. As another example, pressing of a hardware button on the docking station can trigger the selection.

In various embodiments, the position of the passcode entry interface and the positions of buttons on the passcode entry interface are configured based on a touch event history. For example, the general-purpose electronic device may record a touch event history based on user interactions with a user interface, such as a mobile storefront with menu items or a previously presented passcode entry interface, sharing the same touchscreen as the currently presented passcode entry interface. The touch event history can be used to identify regions of high finger touch traffic. The passcode entry interface and the buttons of the passcode entry interface may be selected to overlay the regions of high finger touch traffic in order to hinder any attempt by a wrongdoer to ascertain the passcode entry through fingerprint analysis of the touchscreen.

In other embodiments, the position of the passcode entry interface and the position of a storefront interface can alternate between different sessions of user interaction. This is advantageous in creating an even distribution of finger touch traffic. As such, the alternating positions of the interfaces (e.g., the passcode entry interface) on the touchscreen may hinder any attempt to reverse engineer the passcode entry through fingerprint analysis.

FIG. 1 shows a system architecture of a payment system 100, including a general-purpose electronic device 102 for secure passcode entry, in which the disclosed technique may be applied. The electronic device 102 is a general purpose data processing device. For example, the electronic device 102 may be a mobile phone, a tablet, an e-reader, other mobile or portable computing devices, or other stationary computing devices. The electronic device 102 may be configured to facilitate a financial transaction. The electronic device 102 may be coupled to a card reader 104, which can initiate a financial transaction to purchase items from a merchant operating the electronic device 102 upon detecting a swipe of a payment card 105.

In the illustrated embodiment, the card reader 104 is integral to a docking station 106 and is coupled to the electronic device 102 through the docking station 106. In other embodiments, however, the card reader 104 can be a separate component connected to the electronic device 102 or to the docking station 106. The electronic device 102 may fit into a cavity of the docking station 106 as shown.

In the illustrated embodiment, the docking station 106 and/or the electronic device 102 are coupled to one or more peripheral components, such as a label reader 108, a receipt printer 109, or a cashier drawer 110. The peripheral components can be coupled to the electronic device 102 through a hub device 111, such as a wired hub or a wireless router. A user may purchase various items for checkout through one of the peripheral components, such as through the label reader 108 coupled to the electronic device 102, through a user's mobile device, or through a storefront interface on the electronic device 102. During checkout, the card reader 104 can read and/or access the payment card 105. The payment card 105 may be a credit card, a debit card, an EMV card, or another type of passive or active payment device. The payment card 105 may communicate, for example, via magnetism, radio frequency, near field communication (NFC), acoustic wave, optical modulation, or another method or methods of communication.

Usage of the payment card 105 may require verification of a user identity. One method of verifying the user identity includes having the user inputting a passcode entry and verified the passcode entry against an authentic passcode stored on a remote computer system or on the payment card 105. For example, the electronic device 102 can display a passcode entry interface 112 on a touchscreen 114 of the electronic device 102. When the user inputs each character entry 116, the passcode entry interface 112 can implement a variety of security mechanisms to prevent an onlooker from stealing the passcode composition. As an example, character labels on buttons of the passcode entry interface are shown to be scrambled out of sequence as a security mechanism. Specifics of these various security mechanisms are described below.

Once the payment card 105 and the user identity are verified through the passcode entry interface 112, the electronic device 102 may facilitate the completion of financial transaction.

Figure 2:
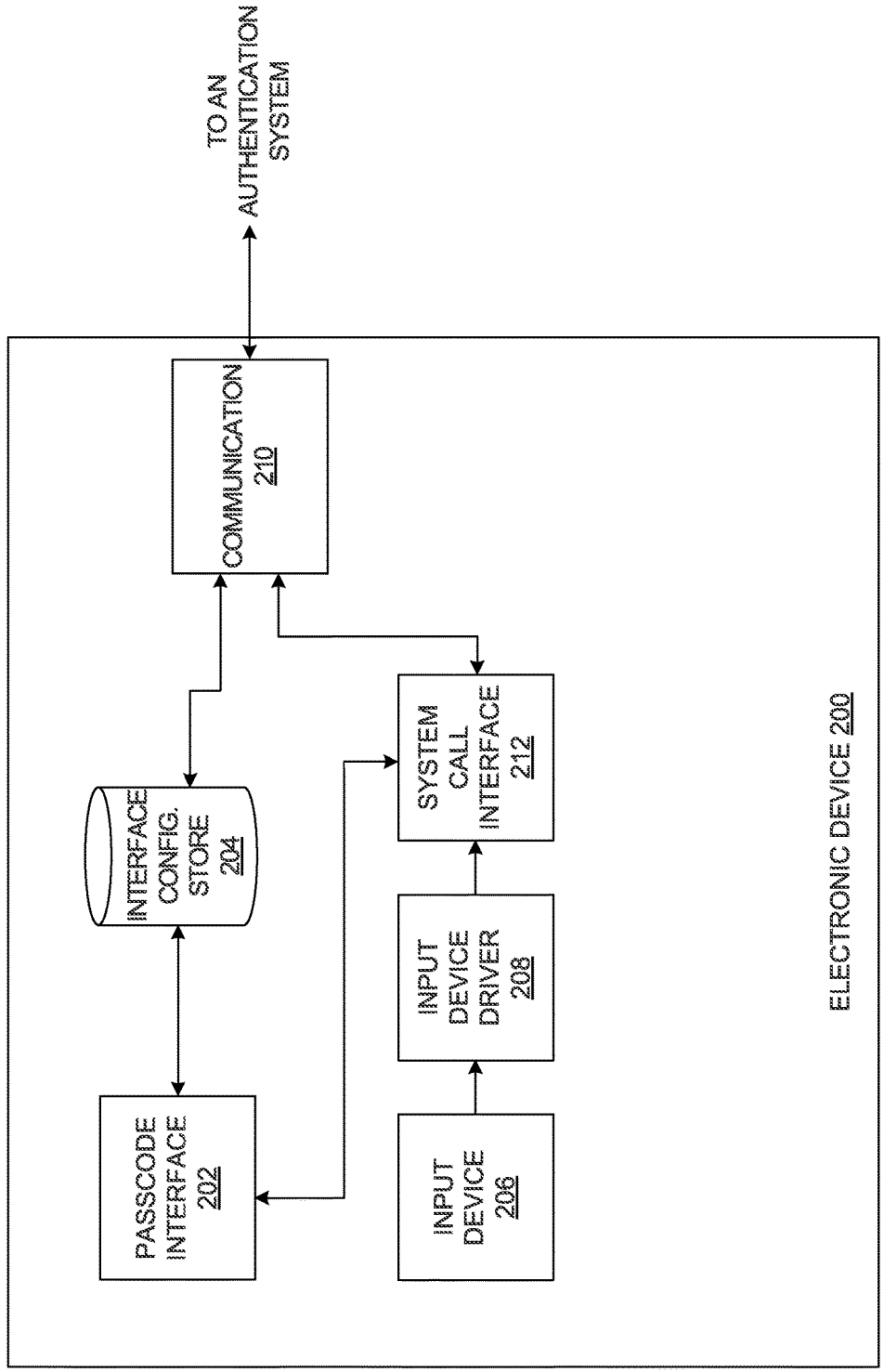
FIG. 2 is a block diagram illustrating an electronic device for passcode entry.

FIG. 2 is a block diagram illustrating an electronic device 200, which may represent the electronic device 102, for passcode entry. The electronic device 200 may be a general-purpose computing device. The electronic device 200 includes a passcode interface module 202, which is configured to present and maintain a passcode entry interface.

In various embodiments, the passcode interface module 202 is configured to generate the passcode interface. The passcode interface module 202 may generate the passcode interface in accordance with various security mechanisms described below. Each security mechanism, for example, may configure the passcode entry interface including adjusting a layout of the passcode entry interface. Such configurations are stored as a passcode interface configuration. The size, arrangement, position, orientation, shape, and other absolute or relative geometric characteristics of the passcode interface and elements within the passcode interface are all examples of the passcode interface configuration. Various passcode interface configurations may be selected to promote concealment of a user's entry of a passcode on the passcode entry interface.

In one embodiment, the passcode entry interface includes buttons corresponding to character options for composing a passcode entry. In other embodiments, the passcode entry interface includes a character selection reel, which is configured to toggle amongst different character options for composing a passcode entry. The passcode interface configuration may indicate different shapes, size, arrangement, or other geometric characteristics for the passcode entry interface.

The passcode interface configuration may also indicate various interactions and/or animation of the passcode entry interface in response to user interactions. For example, the passcode entry interface includes at least a mechanism for registering a character entry, that is, a selection by a user of a particular character option as being part of the passcode entry.

In other embodiments, the passcode interface configuration is provided by a remote system through a network (not shown), and the passcode interface is generated and displayed based on the passcode interface configuration from the remote system. In those embodiments, once received, the passcode interface configuration is stored in an interface configuration store 204. The passcode interface configuration may then be used by the passcode interface module 202 to present the passcode interface to the user.

The passcode interface module 202 may further be configured to present the passcode interface in a variety of ways. As an example, the presentation of the passcode interface may include displaying or rendering the passcode interface on a touchscreen in accordance with the passcode interface configuration, such as a layout configuration. The passcode interface module 202 may render the passcode interface in a two-dimensional or three-dimensional manner. The passcode interface module 202 may also present the passcode interface in other ways, including presenting the passcode interface through animation, audio, webpage, widget, other passive or interactive multimedia, or any combination thereof.

The passcode interface module 202 may be configured to maintain feedback based on an interactivity between the passcode interface and a user. For example, the passcode interface module 202 may be coupled to a touchscreen of the electronic device 200, such as the touchscreen 108 of FIG. 1. The interactivity enables the passcode interface to provide feedback as a user enters a character or a set of characters to be part of the passcode entry.

A record of interactivity is captured with an input device 206, such as the touchscreen 114 of FIG. 1 or an external device coupled to the electronic device 200. The input device 206 is controlled by an input device driver 208 of the electronic device 200. The input device driver 208 may run on a kernel level of an operating system of the electronic device 200.

In various embodiments, the input device driver 208 captures an input stream from the input device 206. The input device 206 may include any input hardware (i.e., one or more sensors) capable of detecting an sensor entry which implicates (i.e., indicative of) a user's interaction with the passcode interface. The sequence of sensor entries received may constitute the input stream.

A communication module 210 is configured to request a sensor input stream from a system call interface module 212 of the electronic device 200. The system call interface module 212 may be part of an operating system kernel of the electronic device 200. The system call interface module 212 may respond to the request by retrieving the sensor input stream from the input device driver module 208. In various embodiments, the passcode interface module 202 is also coupled to the system call interface 212. For example, the passcode interface module 202 can track touch events interacting with elements of the passcode entry interface to update the passcode entry interface.

In response to receiving the sensor input stream, the communication module 210 may be configured to send a portion of the sensor input stream to an external system (not shown), such as an authentication system or a financial service system, through a network. The portion may be selected from sensor entries recorded while presenting the passcode interface on the electronic device 200.

When the passcode interface configuration is generated on the electronic device 200, the communication module 210 may transmit the passcode interface configuration to the external system such that the external system may use a portion of a sensor input stream and the passcode interface configuration to decipher the passcode entry by the user. In other embodiments, the deciphering of the passcode entry by the user is performed on the electronic device 200.

Blocks, components, and/or modules associated with the electronic device 200 may be implemented in the form of special-purpose circuitry, or in the form of one or more appropriately programmed programmable processors, or a combination thereof. For example, the modules described can be implemented as instructions on a tangible storage memory capable of being executed by a processor or a controller on a machine. The tangible storage memory may be a volatile or a non-volatile memory. In some embodiments, the volatile memory may be considered "non-transitory" in the sense that it is not a transitory signal. Modules may be operable when executed by a processor or other computing device, e.g., a single board chip, application specific integrated circuit, a field programmable field array, a network capable computing device, a virtual machine terminal device, a cloud-based computing terminal device, or any combination thereof.

Each of the modules may operate individually and independently of other modules. Some or all of the modules may be executed on the same host device or on separate devices. The separate devices can be coupled via a communication module to coordinate its operations via an interconnect or wirelessly. Some or all of the modules may be combined as one module.

A single module may also be divided into sub-modules, each sub-module performing separate method step or method steps of the single module. In some embodiments, the modules can share access to a memory space. One module may access data accessed by or transformed by another module. The modules may be considered "coupled" to one another if they share a physical connection or a virtual connection, directly or indirectly, allowing data accessed or modified from one module to be accessed in another module. In some embodiments, some or all of the modules can be upgraded or modified remotely. The electronic device 200 may include additional, fewer, or different modules for various applications.

The interface configuration store 204 described may be implemented in one or more hardware memory components or portions of the hardware memory components. The interface configuration store 204 may be implemented as a dynamic database service or a static data structure. The store can be implemented by a single physical device or distributed through multiple physical devices. The storage space of the store can be allocated at run-time of the modules described above, such as the passcode interface application 202.

Figure 3:
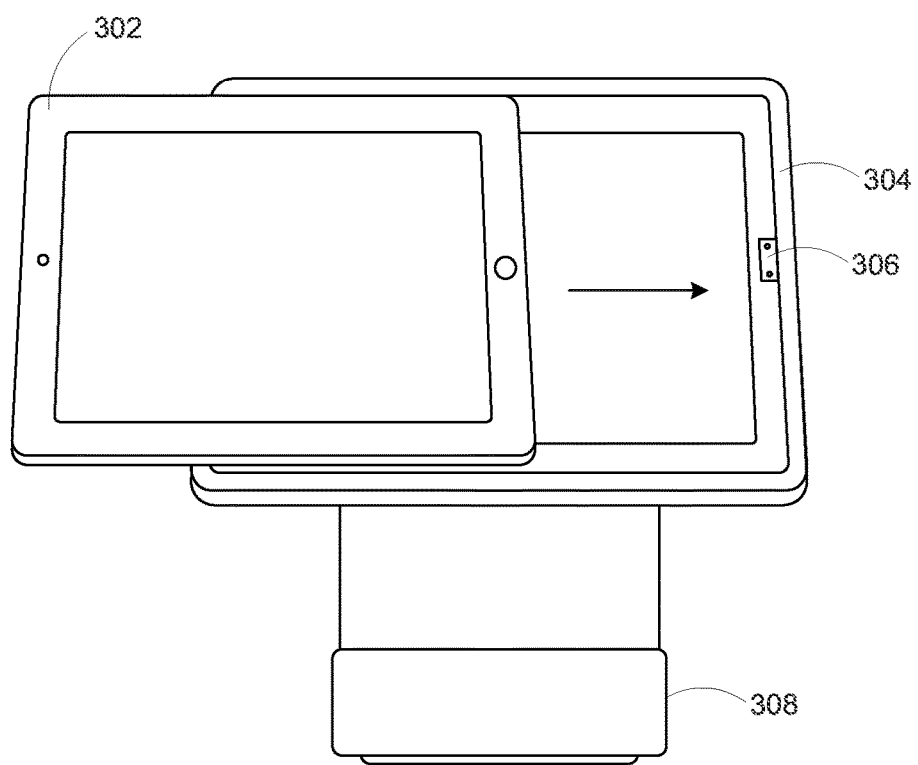
FIG. 3 is a diagram illustrating an electronic device coupled to a docking station.

FIG. 3 is a diagram illustrating an electronic device 302, such as the electronic device 102 or the electronic device 200, coupled to a docking station 304, such as the docking station 106. As shown, the electronic device 302 is detachably connectable to the docking station 304 via a connector 306. Once connected, the electronic device 302 may fit in a cavity in a frame of the docking station 106. The docking station 106 includes a card reader 308, such as the card reader 104.

Figure 4:
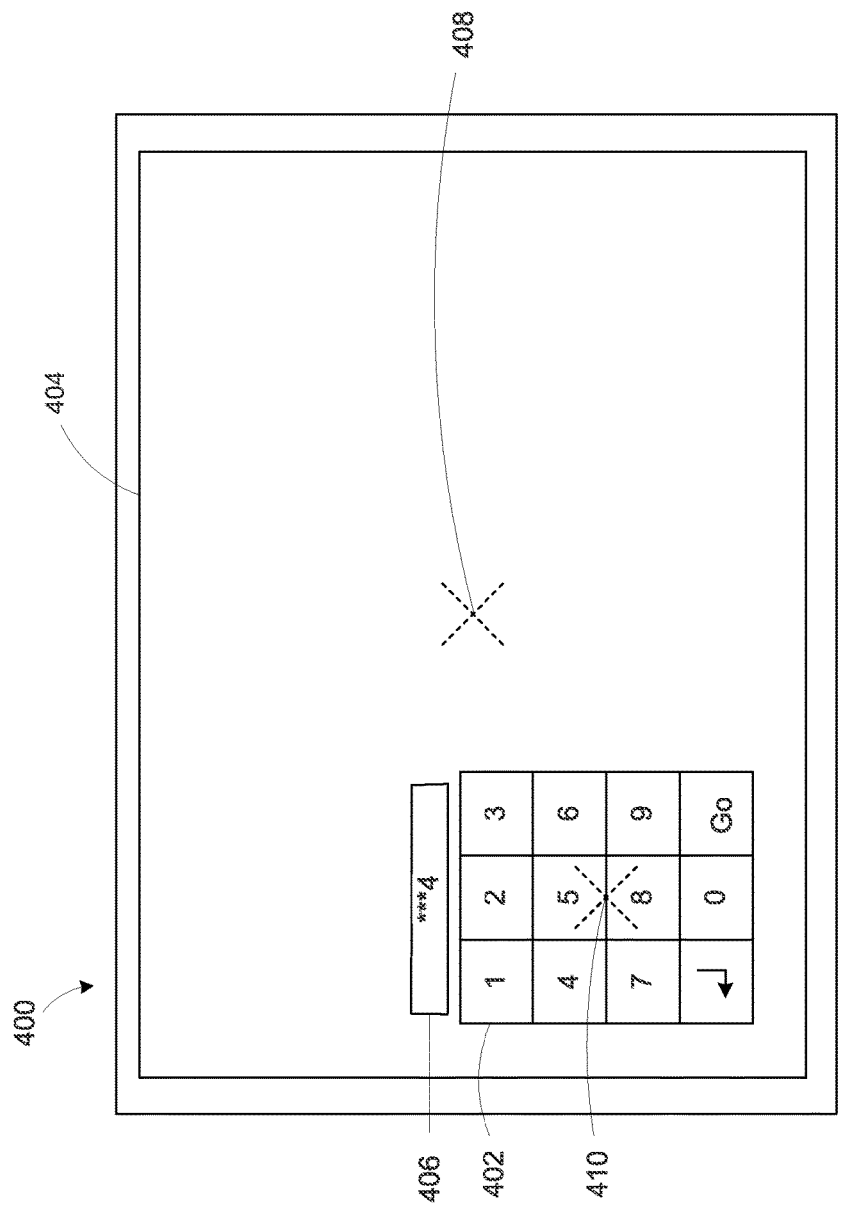
FIG. 4 illustrates an electronic device displaying a passcode entry interface at a corner of a touchscreen.

FIG. 4 illustrates an electronic device 400, such as the electronic device 102 or the electronic device 200, displaying a passcode entry interface 402 at a corner of a touchscreen 404, such as the touchscreen 114. The passcode entry interface 402 may be the passcode entry interface 112. The passcode entry interface 402 may be generated by the passcode interface module 202. Optionally, the touchscreen 404 may display a feedback window 406, which is configured to display the most recent character entry through the passcode entry interface 402 and/or how many character entries have been made to compose a passcode entry.

As shown, the passcode entry interface 402 may be positioned off-center from a touchscreen center point 408 of the touchscreen 404. That is, the touchscreen center point 408 is substantially spaced apart from an interface center point 410. The off-center positioning, such as positioning the passcode entry interface 402 at a corner of the touchscreen 404, is advantageous by allowing a user inputting through the passcode entry interface 402 to shield the passcode entry interface 402 with his or her hand, such as by cupping the passcode entry interface 402 with the hand. The off-center positioning of the passcode entry interface 402 may be in accordance with various embodiments described herein, such as passcode entry interfaces with various button arrangements, geometries, adornments, and/or interaction mechanisms.

Figure 5B:
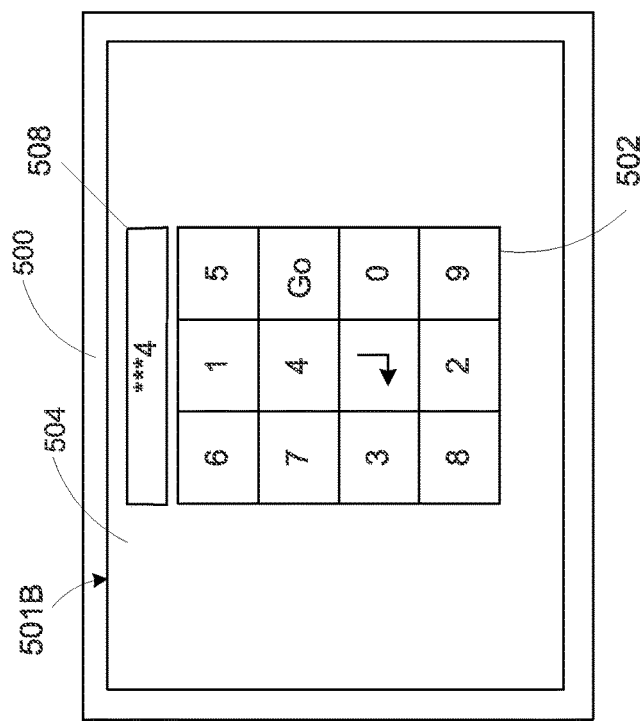
FIG. 5B illustrates the electronic device of FIG. 5A displaying the passcode entry interface on the touchscreen with the buttons of the passcode entry interface rearranged in response to a touch on the touchscreen.
Figure 5A:
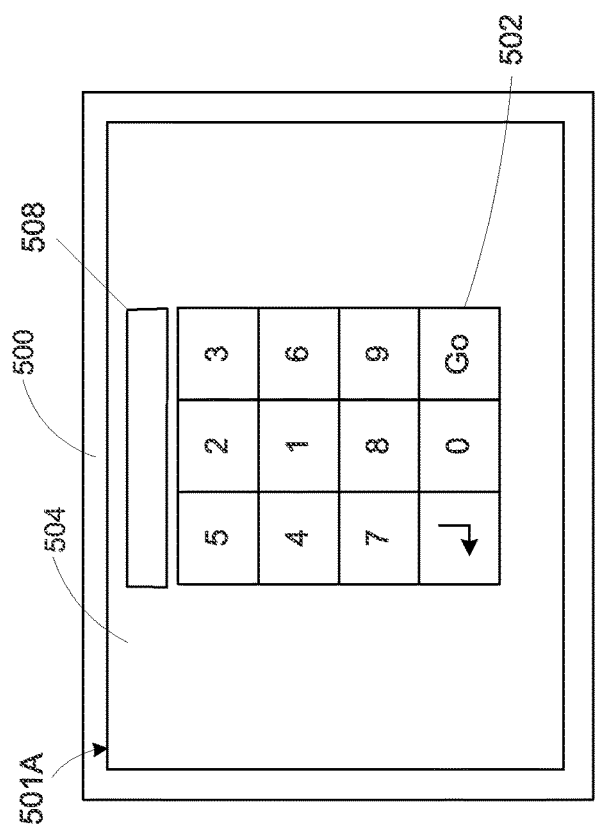
FIG. 5A illustrates an electronic device displaying a first screenshot including a passcode entry interface on a touchscreen with buttons of the passcode entry interface displayed out of sequence.

FIG. 5A illustrates an electronic device 500 displaying a first screenshot 501A including a passcode entry interface 502, such as the passcode entry interface 112, on a touchscreen 504 with buttons 506 of the passcode entry interface 502 displayed out of sequence from a natural sequence of the character options (e.g., numeric sequence or alphabetical sequence). The electronic device 500 may be the electronic device 102 or the electronic device 200. The passcode entry interface 502 may be generated and displayed by the passcode interface module 202. As shown, the buttons 506 are each labeled by a corresponding character option for composing a passcode entry. For example the buttons 506 are shown to be label by numeric digits from zero to nine. Optionally, the touchscreen 504 may display a feedback window 508, which is configured to display the most recent character entry through the passcode entry interface 502 and/or how many character entries have been made to compose a passcode entry.

In various embodiments, the initial state is arranged such that the buttons 506 are in-sequence. In other embodiments, as shown, the initial state is arranged such that the buttons 506 are out of sequence. For example, the first screenshot 501A may be represented as an initial state of the passcode entry interface 502, illustrating the buttons 506 arranged out of sequence.

A conventional passcode entry interface arranges the buttons 506 in accordance with an alphabetical or numerical order. For example, in the passcode entry interface 112 and the passcode entry interface 402, the buttons are illustrated as arranged in numerical order (e.g., ordered as horizontal lines from "1" to "9" with"0" considered as after "9"). In contrast, the passcode entry interface 502 arranges the buttons 506 out of its numerical sequence. The passcode entry interface 502 may be arranged at random. Fixed positions for buttons may be assigned on the passcode entry interface 502, where each button with a specific character assignment is randomized.

FIG. 5B illustrates the electronic device 500 of FIG. 5A displaying a second screenshot 501B including the passcode entry interface 502 on the touchscreen 504 with the buttons 506 of the passcode entry interface 502 rearranged in response to a touch on the touchscreen 504. The second screenshot 501B may be part of a screen sequence illustrating the buttons 506 arranged out of sequence and different from the arrangement in the first screenshot 501A. The second screenshot 520 represents a subsequent state of the passcode entry interface 502 after a character entry has already been made. For example, in response to a touch event over one of the buttons 506 on the touchscreen 504, the electronic device 500 can rearrange the buttons 506 on the passcode entry interface 502. The out of sequence arrangement and rearrangement of the passcode entry interface 502 may be in accordance with various embodiments described herein, such as passcode entry interfaces with various button arrangements, positioning, geometries, adornments, and/or interaction mechanisms.

Figure 6:
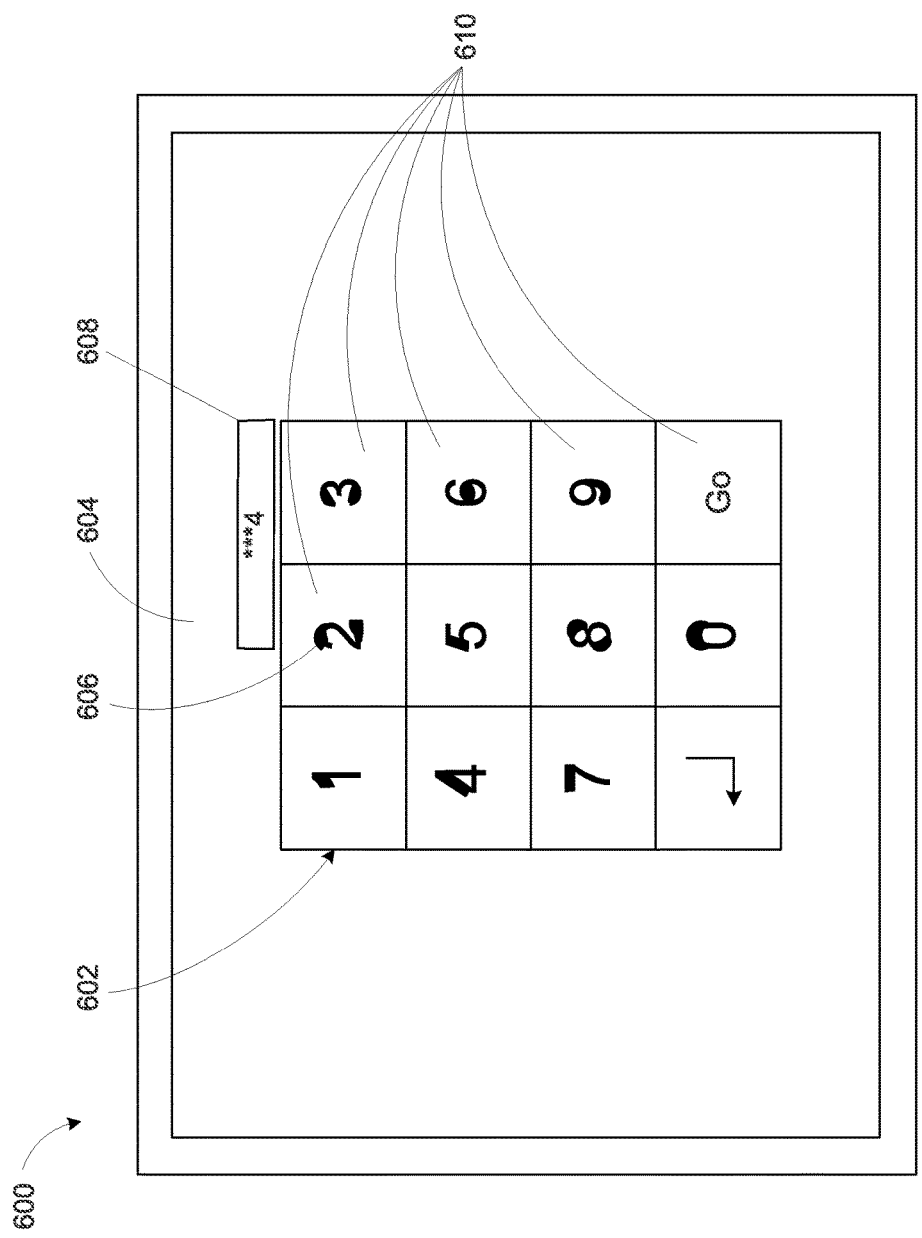
FIG. 6 illustrates an electronic device displaying a passcode entry interface on a touchscreen with stroke width variations on each character label of the passcode entry interface.

FIG. 6 illustrates an electronic device 600 displaying a passcode entry interface 602, such as the passcode entry interface 112, on a touchscreen 604, such as the touchscreen 114, with stroke width variations on each character label 606 of the passcode entry interface 602. The electronic device 600 may represent the electronic device 102 or the electronic device 200. The passcode entry interface 602 may be generated and displayed by the passcode interface module 202. Optionally, the touchscreen 604 may display a feedback window 608, which is configured to display the most recent character entry through the passcode entry interface 602 and/or how many character entries have been made to compose a passcode entry.

As shown, the passcode entry interface 602 includes buttons 610. Each of the buttons 610 may include a character label 606. The character label 606 displays a visual representation of a character option, corresponding to each button 610, for composing a passcode entry. For example, the character label 606 may be a visual display of the numeric digit "2." The electronic device 600 may render the character label 606 having stroke width variations therein. That is, pixel density within the character label 606 is varied against conventional standards for the corresponding character option. The stroke width variations may be exaggerated up to the point where the character label 606 is recognizable at a close distance within an arm's length, but unrecognizable at a distance beyond the arm's length or at an angle substantially parallel to the touchscreen 604. The stroke width variations of the character label 606 on the passcode entry interface 602 may be in accordance with various embodiments described herein, such as passcode entry interfaces with various button arrangements, positioning, geometries, adornments, and/or interaction mechanisms.

Figure 7:
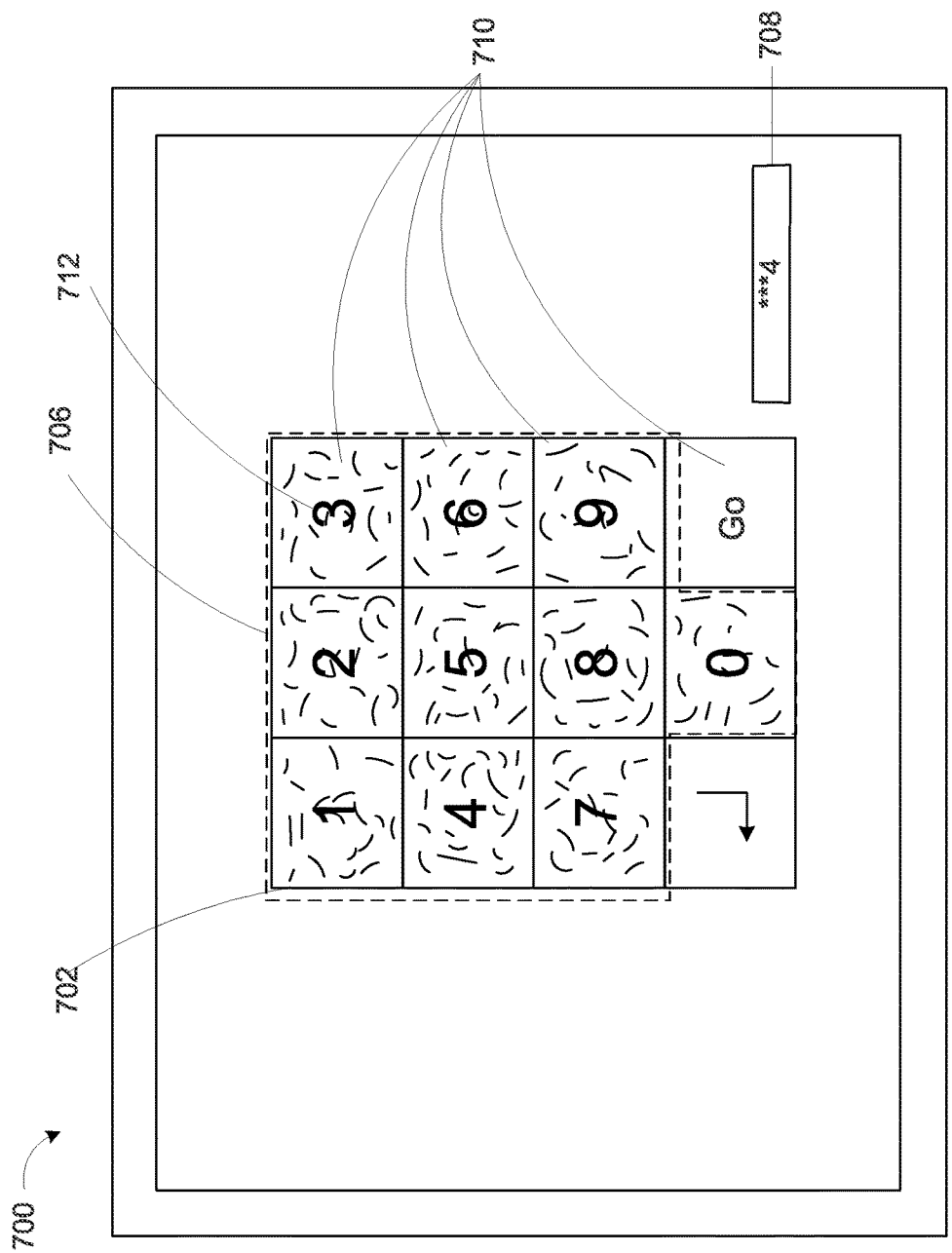
FIG. 7 illustrates an electronic device displaying a passcode entry interface on a touchscreen with the passcode entry interface covered by a concealment layer.

FIG. 7 illustrates an electronic device 700 displaying a passcode entry interface 702, such as the passcode entry interface 112, on a touchscreen 704, such as the touchscreen 114, with the passcode entry interface 702 covered by a concealment layer 706. The electronic device 700 may represent the electronic device 102 or the electronic device 200. The passcode entry interface 702 may be generated and displayed by the passcode interface module 202. Optionally, the touchscreen 704 may display a feedback window 708, which is configured to display the most recent character entry through the passcode entry interface 702 and/or how many character entries have been made to compose a passcode entry.

As shown, the passcode entry interface 702 includes buttons 710. Each of the buttons 710 may include a character label 712. The character label 712 displays a visual representation of a character option, corresponding to each button 710, for composing a passcode entry. For example, the character label 712 can be a visual display of the numeric digit "3." The concealment layer 706 includes a distribution of visual obstructions, such as blots, line segments (e.g., straight, curved or wavy), spots, stains, blemishes, other low-density geometries, or any combination thereof. The visual obstructions may be distributed randomly or follow a linear or two dimensional pattern. The visual obstructions may be aligned over each of the buttons 710. The concealment layer 706 may reveal (i.e., by absence of the visual obstructions) some of the buttons 710 that are functional elements of the passcode entry interface 702, such as back arrow button and the "GO" button. The concealment layer 706 over the passcode entry interface 702 may be in accordance with various embodiments described herein, such as passcode entry interfaces with various button arrangements, positioning, geometries, adornments, and/or interaction mechanisms.

Figure 8A:
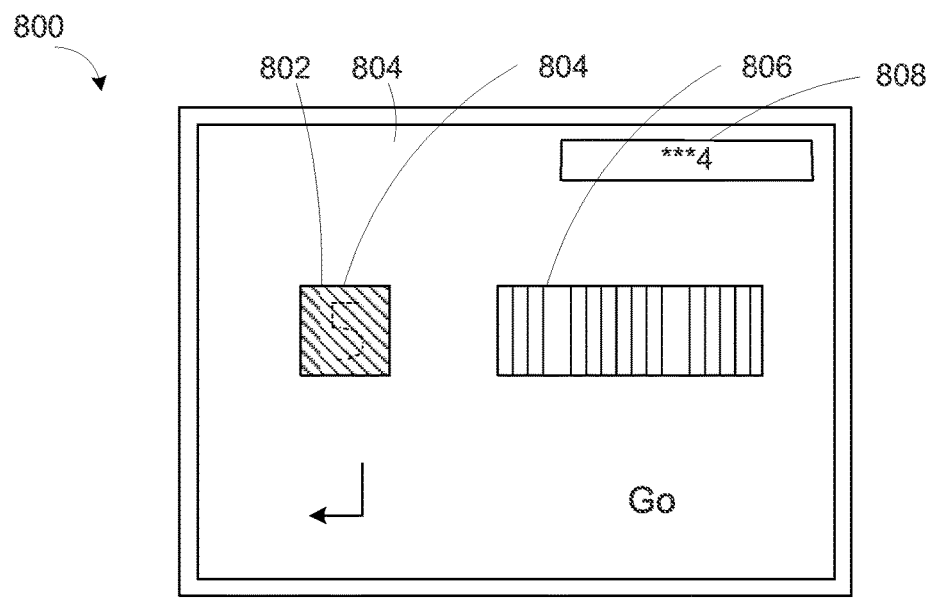
FIG. 8A illustrates an electronic device displaying a first screenshot including a passcode entry interface on a touchscreen with a line moiré region sliding over the passcode entry interface.

FIG. 8A illustrates an electronic device 800 displaying a first screenshot 801A including a passcode entry interface 802, such as the passcode entry interface 112, on a touchscreen 804, such as the touchscreen 114, with a line moiré region 806 sliding over the passcode entry interface 802. The electronic device 800 may represent the electronic device 102 or the electronic device 200. The passcode entry interface 802 may be generated and displayed by the passcode interface module 202. Optionally, the touchscreen 804 may display a feedback window 808, which is configured to display the most recent character entry through the passcode entry interface 802 and/or how many character entries have been made to compose a passcode entry.

As shown, the passcode entry interface 802 includes a button 810 with a character label 812 displayed thereon. The button 810 is fashioned with a first line moiré pattern 814 having the character label 812 disguised in the first line moiré pattern 814. For illustrative purposes, only a single button is shown. However, the passcode entry interface 802 may include other buttons as well.

The line moiré region 806 may be a geometric shape displayed on the touchscreen 804 that is filled with a second line moiré pattern 816. The line moiré region 806 may slide over the button 810. For example, the sliding may be in response to a swipe gesture over the line moiré region 806 or based on a scheduled animation by the electronic device 800.

Figure 8B:
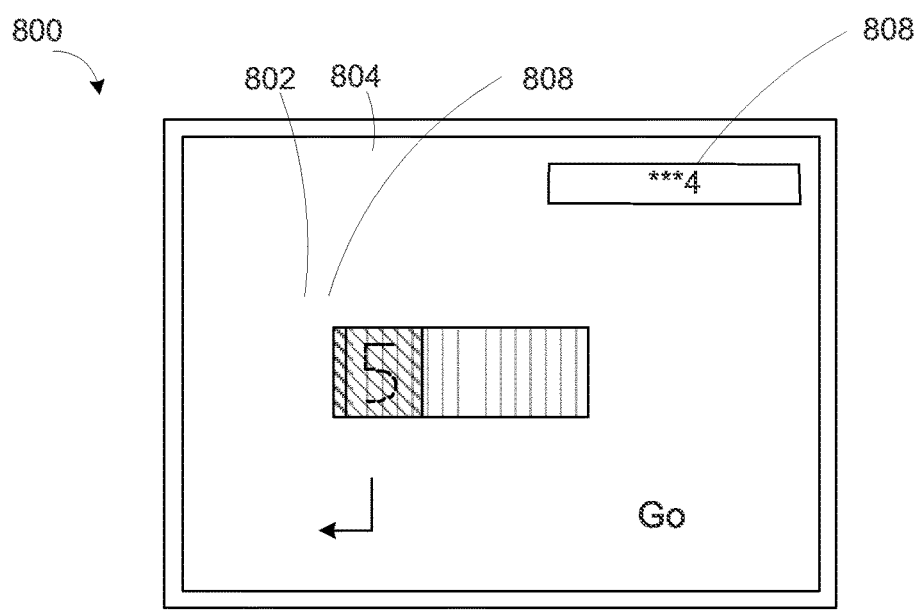
FIG. 8B illustrates the electronic device of FIG. 8A displaying a second screenshot including the passcode entry interface on the touchscreen device with the line moiré region covering part of the passcode entry interface.

FIG. 8B illustrates the electronic device 800 of FIG. 8A displaying a second screenshot 801B including the passcode entry interface 802 on the touchscreen device 804 with the line moiré region 802 covering part of the passcode entry interface 800. When the first line moiré pattern 814 and the second line moiré pattern 816 overlap, the character label 812 is shown to be revealed. The concealing and revealing of the character label 812 through the sliding line moiré region 806 over the passcode entry interface 802 may be in accordance with various embodiments described herein, such as passcode entry interfaces with various button arrangements, positioning, geometries, adornments, and/or interaction mechanisms.

Figure 9B:
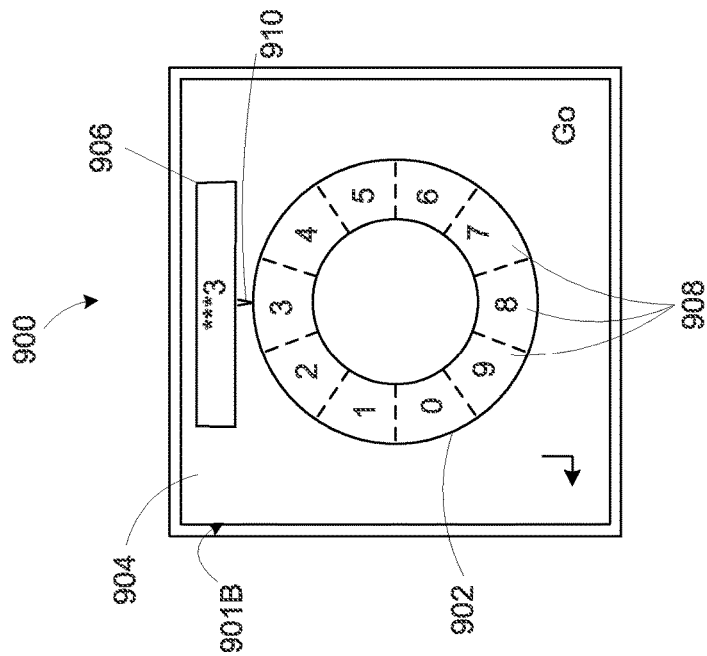
FIG. 9B illustrates the electronic device of FIG. 9A displaying a second screenshot with the passcode entry interface of FIG. 9A rotated in response to a touch on the touchscreen.
Figure 9A:
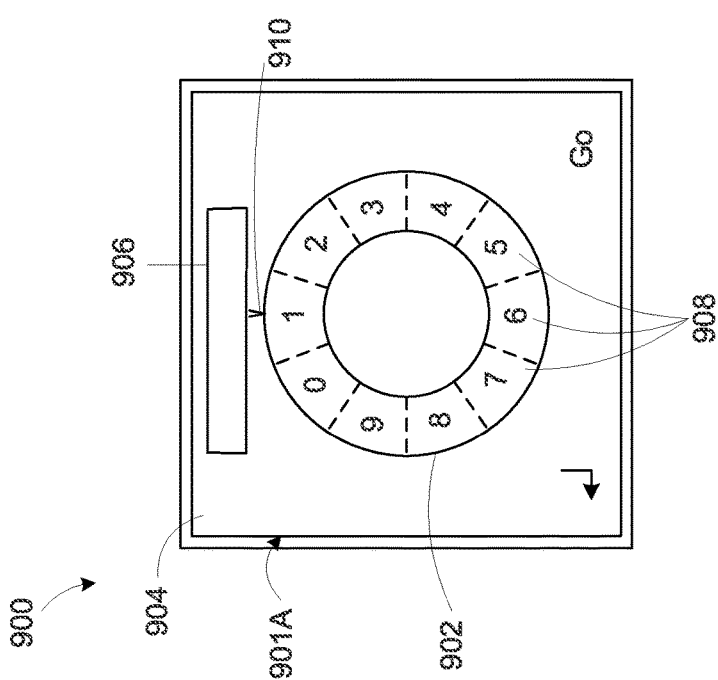
FIG. 9A illustrates an electronic device displaying a first screenshot including a passcode entry interface shaped in a loop pattern on a touchscreen.

FIG. 9A illustrates an electronic device 900 displaying a first screenshot 901A including a passcode entry interface 902, such as the passcode entry interface 112, shaped in a loop pattern on a touchscreen 904, such as the touchscreen 114. The electronic device 900 may represent the electronic device 102 or the electronic device 200. The passcode entry interface 902 may be generated and displayed by the passcode interface module 202. Optionally, the touchscreen 904 may display a feedback window 906, which is configured to display the most recent character entry through the passcode entry interface 902 and/or how many character entries have been made to compose a passcode entry.

As shown, the passcode entry interface 902 may be shaped as a ring with buttons 908 distributed evenly and radially. Each button 908 may correspond with a character option for composing a passcode entry. A character entry by a user may be recorded on the passcode entry interface 902 by, for example, the electronic device 900 detecting a touch event over one of the buttons 908.

Alternatively, the passcode entry interface 902 may be implemented similar to a rotary dial phone, where a circular/elliptical motion gesture on the touchscreen 904 rotates the passcode entry interface 902. As a user rotates the passcode entry interface now to, a fixed point 910 tangential to the passcode entry interface 902 may indicate which character the user has selected. When the circular/elliptical motion gesture and, the button closest to the fixed point 910 may be appended to the construction of the passcode entry.

In various embodiments, the electronic device 900 generates an initial state of the passcode entry interface 902 with a randomized rotation while keeping the characters represented by the buttons 908 in sequence (e.g., in numeric sequence or in alphabetical sequence). The randomized rotation is advantageous because an onlooker looking over the shoulder of the user cannot approximate which character the user has entered based on the location of the user's finger. On the other hand, the characters represented by the buttons 908 remains in sequence and in symmetry. For example, any pair of characters across from each other remains in the same relative position. In some embodiments, the characters represented by the buttons 908 are completely randomized or randomized with the constraint that pairs of characters across from each other remains the same as when the characters are in sequence.

FIG. 9B illustrates the electronic device 900 of FIG. 9A displaying a second screenshot 901B with the passcode entry interface 902 rotated in response to a touch on the touchscreen 904. The second screenshot 901B may represent the passcode entry interface 902 in response to a prior character entry, such as a touch event over one of the buttons 908. The passcode entry interface 902 may be rotated in response to a prior character entry. The passcode entry interface 902 may be randomly rotated or rotated based on a determined pattern. The passcode entry interface 902 shaped in a loop pattern may be in accordance with various embodiments described herein, such as passcode entry interfaces with various button arrangements, positioning, geometries, adornments, and/or interaction mechanisms.

Figure 10:
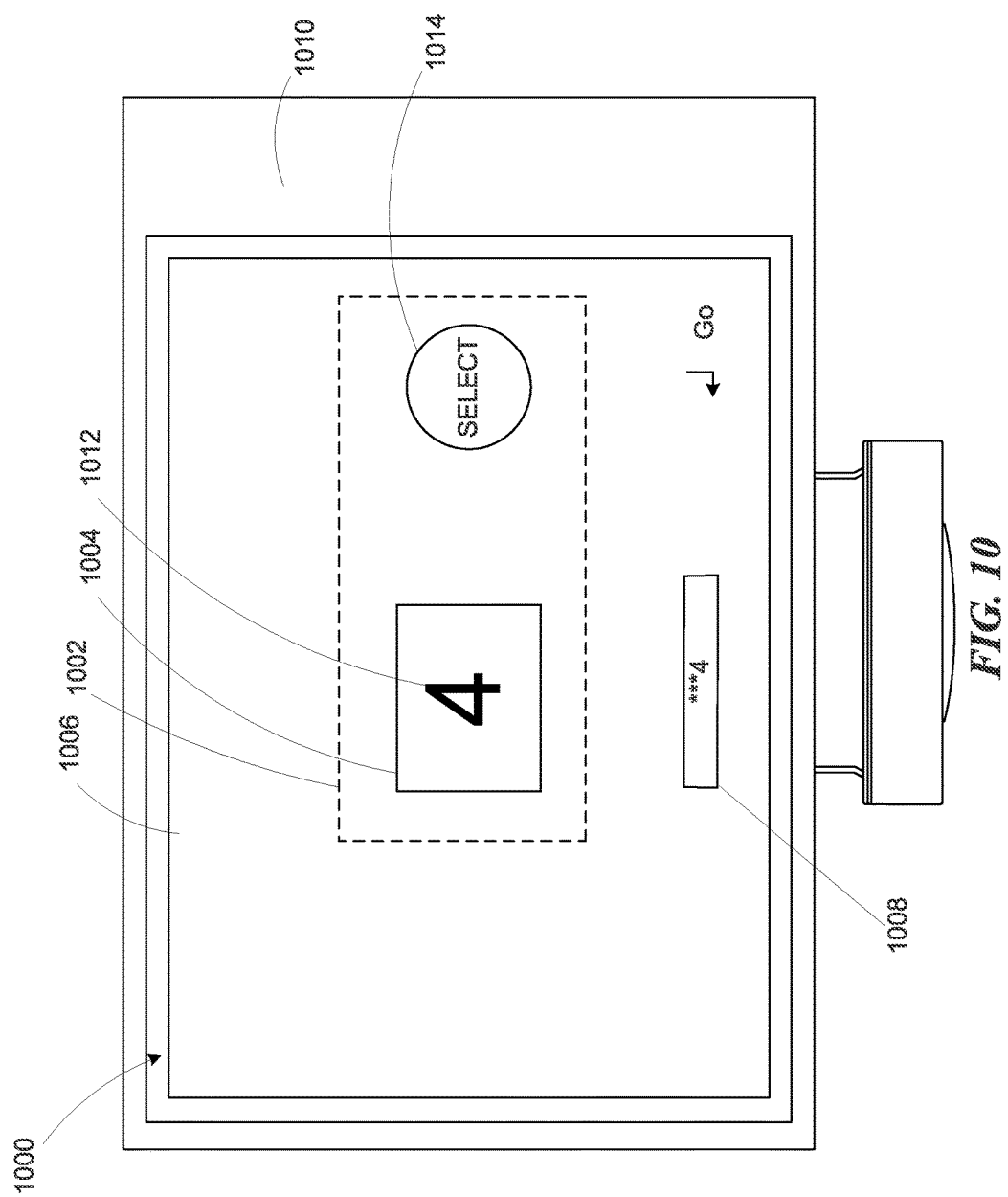
FIG. 10 illustrates an electronic device displaying a passcode entry interface with a character selection reel on a touchscreen.

FIG. 10 illustrates an electronic device 1000 displaying a passcode entry interface 1002, such as the passcode entry interface 112, with a character selection reel 1004 on a touchscreen 1006, such as the touchscreen 114. The electronic device 1000 may represent the electronic device 102 or the electronic device 200. The passcode entry interface 1002 may be generated and displayed by the passcode interface module 202. Optionally, the touchscreen 1006 may display a feedback window 1008, which is configured to display the most recent character entry through the passcode entry interface 1002 and/or how many character entries have been made to compose a passcode entry. The electronic device 1000 is illustrated to be coupled with a docking station 1010, such as the docking station 106. The passcode entry interface 1002 can operate without the docking station 1010, and the docking station 1010 is illustrated only for comparison purposes with FIGS. 11-13.

In various embodiments, the passcode entry interface 1002 includes one or more of the character selection reel 1004. The character selection reel 1004 may be displayed as a window displaying a single character label 1012. The character selection reel 1004 is associated with character options for composing a passcode entry. The character options may be structured as an invisible list with the window of the character selection reel 1004 revealing the single character label 1012 from the character options. The character selection reel 1004 may be responsive to one or more user input mechanisms for switching amongst the character options. For example, the character selection reel 1004 may be responsive to a swiping gesture detected over the character selection reel 1004. The swiping gesture triggers switching a selection from amongst the character options, such as up and down through the vertical list of the character options.

The single character label 1012 displayed by the character selection reel 1004 can be selected, such as by pressing of a selection button 1014 on the touchscreen 1006. The selection button 1014 may be a standalone button with its own label or an invisible button overlay on top of the character selection reel 1004. The passcode entry interface 1002 with the character selection reel 1004 may be in accordance with various embodiments described herein, such as passcode entry interfaces with various button arrangements, positioning, geometries, adornments, and/or interaction mechanisms.

Figure 11:
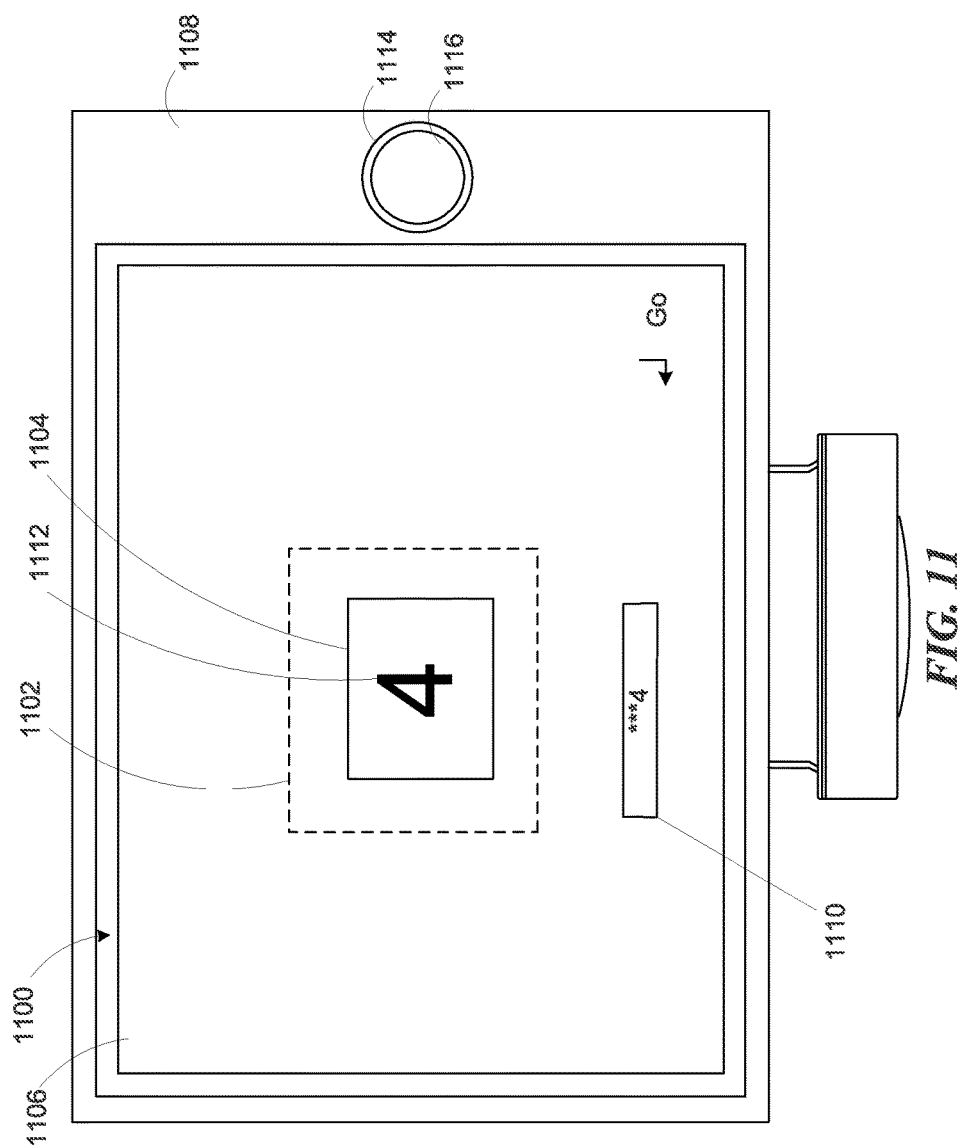
FIG. 11 illustrates an electronic device displaying a passcode entry interface with a character selection reel on a touchscreen with the character selection reel controlled by a docking station.

FIG. 11 illustrates an electronic device 1100 displaying a passcode entry interface 1102, such as the passcode entry interface 112, with a character selection reel 1104 on a touchscreen 1106, such as the touchscreen 114, with the character selection reel 1104 controlled by a docking station 1108, such as the docking station 106. The electronic device 1100 may represent the electronic device 102 or the electronic device 200. The passcode entry interface 1102 may be generated and displayed by the passcode interface module 202. Optionally, the touchscreen 1106 may display a feedback window 1110, which is configured to display the most recent character entry through the passcode entry interface 1102 and/or how many character entries have been made to compose a passcode entry.

In various embodiments, the passcode entry interface 1102 includes one or more of the character selection reel 1104. The character selection reel 1104 may be displayed as a window displaying a single character label 1012. The character selection reel 1104 is associated with character options for composing a passcode entry. The character options may be structured as an invisible list with the window of the character selection reel 1104 revealing the single character label 1112 from the character options. Responsive to a user input through the docking station 1108, the character selection reel 1104 can toggle amongst the character options. For example, a dial 1114 on the docking station 1108 can be rotated by a user to indicate a scrolling command to the character selection reel 1104. The dial 1114 is a physical mechanism on the docking station 1108, such as a button, a touch sensitive ring, a sliding ring, or other physical means of indicating traversal. The docking station 1108 can communicate the scrolling command from the docking station 1108 to the electronic device 1100 via an interconnect, such as the connector 306.

The single character label 1112 displayed by the character selection reel 1104 can be selected by issuing a selection command from the docking station 1108. The selection command may be communicated through the interconnect from the docking station 1108 to the electronic device 1100. For example, the dial 1114 may also serve as a physical button. In other embodiments, an additional button 1116 triggers the selection command. The passcode entry interface 1102 with the character selection reel 1104 controlled by the docking station 1108 may be in accordance with various embodiments described herein, such as passcode entry interfaces with various button arrangements, positioning, geometries, adornments, and/or interaction mechanisms.

Figure 12:
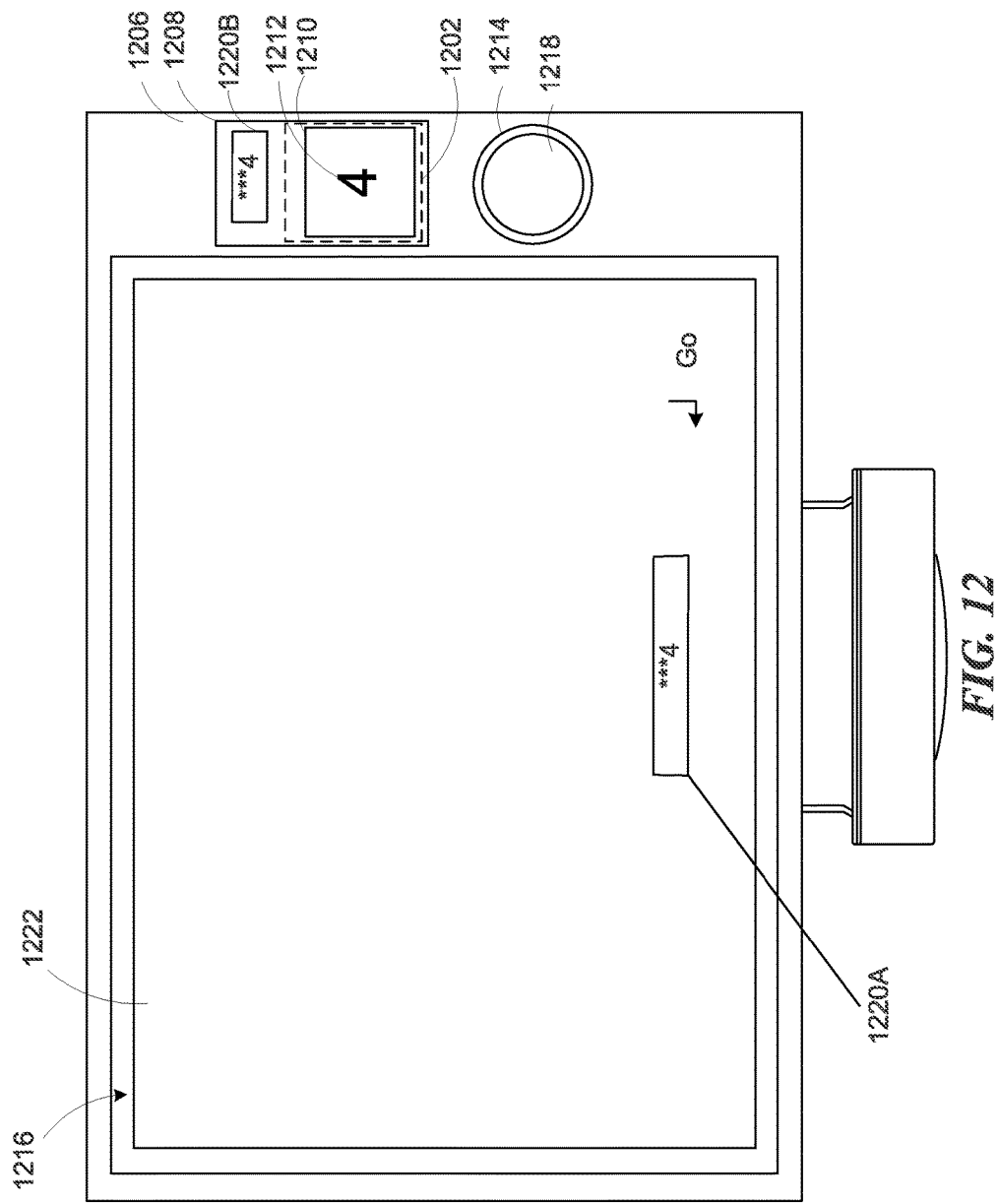
FIG. 12 illustrates a first example of a passcode entry interface implemented on a docking station.

FIG. 12 illustrates a first example of a passcode entry interface 1202 implemented on a docking station 1206, such as the docking station 106. The passcode entry interface 1202 may be similar in geometric characteristics as the passcode entry interface 112. The passcode entry interface 1202 may be generated and controlled by the passcode interface module 202. As shown, the passcode entry interface 1202 is presented on a display 1208 of the docking station 1206. The passcode entry interface 1202 includes a character selection reel 1210. In various embodiments, the display 1208 is polarized. The display 1208 may also include a cover, guard or film that decreases the viewing angle of the display 1208 to prevent an onlooker from overlooking a passcode entry by the user to the passcode entry interface 1202. The display 1208 may be rectangular, round, circular, polyhedral, elliptical or any other geometric shapes.

The character selection reel 1210 may be displayed as a window displaying a single character label 1212. The character selection reel 1210 is associated with character options for composing a passcode entry. The character options may be structured as an invisible list with the window of the character selection reel 1210 revealing the single character label 1212 from the character options. Responsive to a user input through a dial 1214 of the docking station 1206, the character selection reel 1210 can toggle amongst the character options. For example, the dial 1214 can be rotated by a user to indicate a scrolling command to the character selection reel 1210. The dial 1214 is a physical mechanism on the docking station 1206, such as a button, a touch sensitive ring, a sliding ring, or other physical means of indicating traversal. In some embodiments, the docking station 1206 adjusts the character selection reel 1210 directly by changing the single character label 1212 (i.e., from the list of the character options) based on the scrolling command. In other embodiments, the docking station 1206 can communicate the scrolling command from the docking station 1206 to an electronic device 1216, such as the electronic device 102 or the electronic device 200, via an interconnect, such as the connector 306. The electronic device 1216 may in turn respond back with a control command to toggle the single character label 1212 of the character selection reel 1210.

The single character label 1212 displayed by the character selection reel 1210 can be selected based a selection command issued from either the dial 1214 or a button 1218 of the docking station 1206. In the example of the dial 1214, the dial 1214 may also serve as a physical button that, when pressed, issues the selection command. In other embodiments, the button 1218, separate from the dial 1214, triggers the selection command. The selection command may be communicated through the interconnect from the docking station 1206 to the electronic device 1216.

Optionally, a feedback window 1220 (referring to examples of a feedback window 1220A or a feedback window 1220B collectively) may be coupled to the passcode entry interface 1202. The feedback window 1220 is configured to display the most recent character entry through the passcode entry interface 1202 and/or how many character entries have been made to compose a passcode entry. Illustrated are two examples of where the feedback window 1220 may be displayed. In one example, the feedback window 1220A is displayed on a touchscreen 1222 of the electronic device 1216. In another example, feedback window 1220B is displayed on the docking station 1206, such as the display 1208 or a separate display device (not shown) on the docking station 1206. The passcode entry interface 1202 implemented on the docking station 1206 may be in accordance with various embodiments described herein, such as passcode entry interfaces with various button arrangements, positioning, geometries, adornments, and/or interaction mechanisms.

Figure 13:
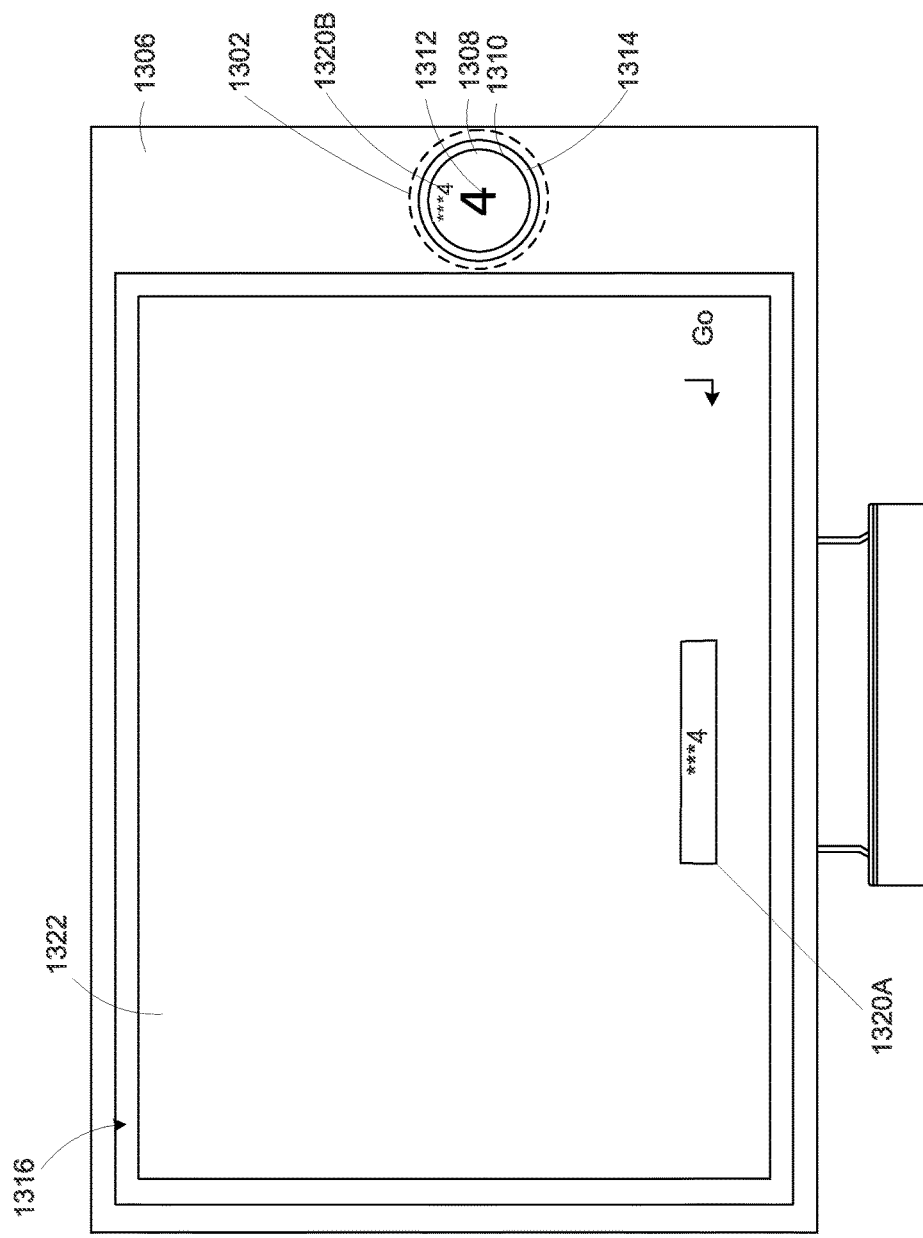
FIG. 13 illustrates a second example of a passcode entry interface implemented on a docking station.

FIG. 13 illustrates a second example of a passcode entry interface 1302 implemented on a docking station 1306, such as the docking station 106. The passcode entry interface 1302 may be similar in geometric characteristics as the passcode entry interface 112. The passcode entry interface 1302 may be generated and controlled by the passcode interface module 202. As shown, the passcode entry interface 1302 is presented on a display 1308 of the docking station 1306. The passcode entry interface 1302 includes a character selection reel 1310. In various embodiments, the display 1308 is polarized. The display 1308 may also include a cover, guard or film that decreases the viewing angle of the display 1308 to prevent an onlooker from overlooking a passcode entry by the user to the passcode entry interface 1302. The display 1308 may be rectangular, round, circular (as shown), polyhedral, elliptical or any other geometric shapes.

The character selection reel 1310 may be displayed as a window displaying a single character label 1312. The character selection reel 1310 is associated with character options for composing a passcode entry. The character options may be structured as an invisible list with the window of the character selection reel 1310 revealing the single character label 1312 from the character options. Responsive to a user input through a dial 1314 of the docking station 1306, the character selection reel 1310 can toggle amongst the character options. As shown, the dial 1314 surrounds the display 1308. This is advantageous because while the user is switching from amongst the character options, the user's hand can shield the displayed 1308 from onlookers attempting to steal the passcode entry.

For example, the dial 1314 can be rotated by a user to indicate a scrolling command to the character selection reel 1310. The dial 1314 is a physical mechanism on the docking station 1306, such as a touch sensitive ring, a slider ring, or other physical means of indicating traversal. In some embodiments, the docking station 1306 adjusts the character selection reel 1310 directly by changing the single character label 1312 (i.e., from the list of the character options) based on the scrolling command. In other embodiments, the docking station 1306 can communicate the scrolling command from the docking station 1306 to an electronic device 1316, such as the electronic device 102 or the electronic device 200, via an interconnect, such as the connector 306. The electronic device 1316 may in turn respond back with a control command to toggle the single character label 1312 of the character selection reel 1310.

The single character label 1312 displayed by the character selection reel 1310 can be selected based a selection command issued from the dial 1314, the display 1308, or another button (not shown) of the docking station 1306. In the example of the dial 1314, the dial 1314 may also serve as a physical button that, when pressed, issues the selection command. In other embodiments, the display 1308 further serves as a button that, when pressed, triggers the selection command. The selection command may be communicated through the interconnect from the docking station 1306 to the electronic device 1316.

Optionally, a feedback window 1320 (referring to examples of a feedback window 1320A or a feedback window 1320B collectively) may be coupled to the passcode entry interface 1302. The feedback window 1320 is configured to display the most recent character entry through the passcode entry interface 1302 and/or how many character entries have been made to compose a passcode entry. Illustrated are two examples of where the feedback window 1320 may be displayed. In one example, the feedback window 1320A is displayed on a touchscreen 1322 of the electronic device 1316. In another example, feedback window 1320B is displayed on the docking station 1306, such as the display 1308 or a separate display device (not shown) on the docking station 1306. The passcode entry interface 1302 implemented on the docking station 1306 may be in accordance with various embodiments described herein, such as passcode entry interfaces with various button arrangements, positioning, geometries, adornments, and/or interaction mechanisms.

Figure 14A:
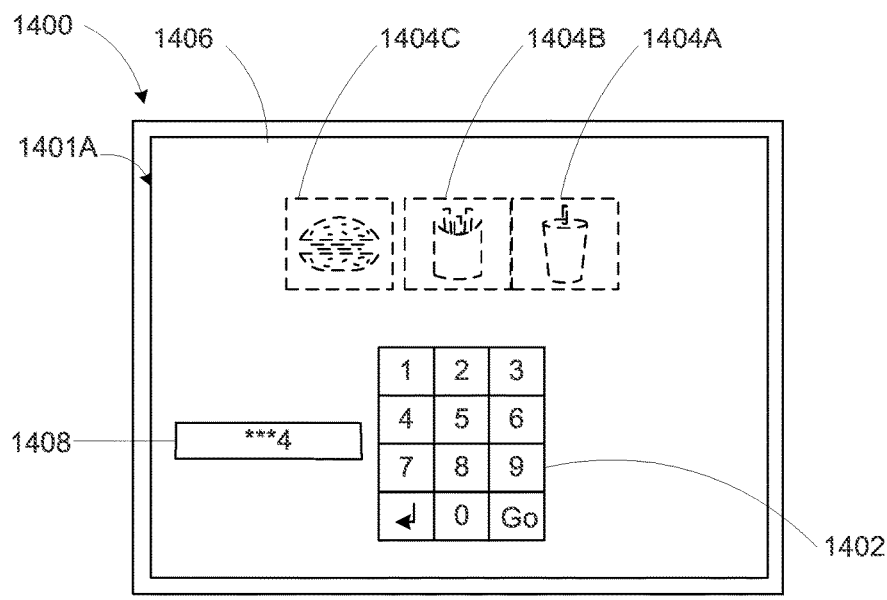
FIG. 14A illustrates an electronic device displaying a first screenshot including a passcode entry interface and a storefront interface element on a touchscreen.

FIG. 14A illustrates an electronic device 1400 displaying a first screenshot 1401A including a passcode entry interface 1402, such as the passcode entry interface 112, and a storefront interface element 1404 on a touchscreen 1406, such as the touchscreen 114. The electronic device 1400 may represent the electronic device 102 or the electronic device 200. The passcode entry interface 1402 may be generated and displayed by the passcode interface module 202. Optionally, the touchscreen 1406 may display a feedback window 1408, which is configured to display the most recent character entry through the passcode entry interface 1402 and/or how many character entries have been made to compose a passcode entry.

The electronic device 1400 can display the storefront interface element 1404 (illustrated as dashed lines, such as menu element 1404A, menu element 1404B, and menu element 1404C collectively referred to as "1404") as part of a first user session of a payment checkout application. In various embodiments, the electronic device 1400 can display the storefront interface elements 1404 prior to displaying the passcode entry interface 1402. In other embodiments, the electronic device 1400 can display the storefront interface elements 1404 at the same time as displaying the passcode entry interface 1402. As shown, the storefront interface element 1404 occupies a different region of the touchscreen 1406 as compared to the passcode entry interface 1402.

Figure 14B:
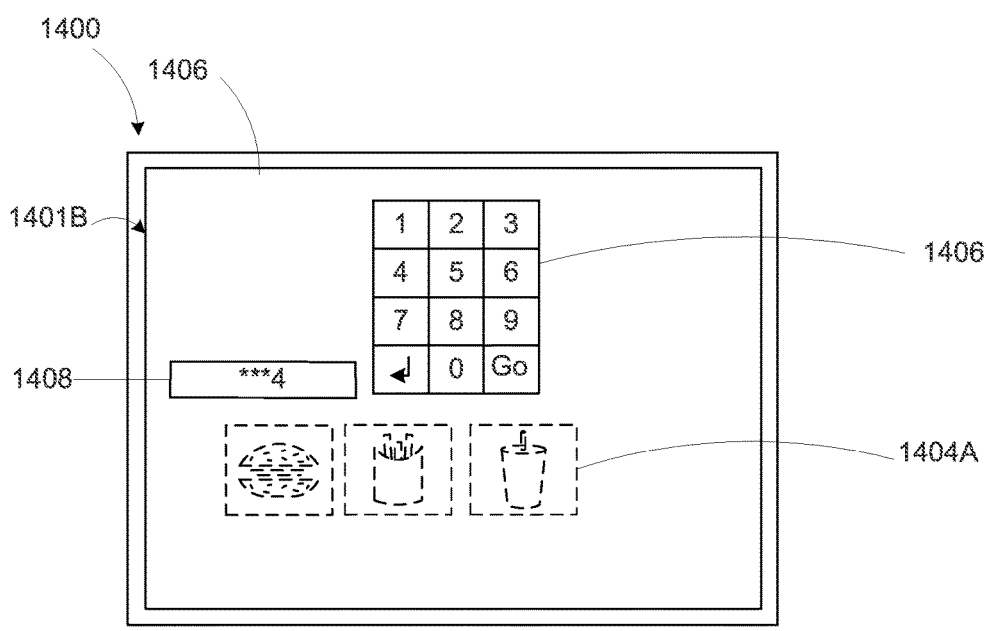
FIG. 14B illustrates the electronic device of FIG. 14A displaying a second screenshot on the touchscreen with positions of the passcode entry interface and the storefront interface element alternated.

FIG. 14B illustrates the electronic device 1400 of FIG. 14A displaying is a second screenshot 1401B on the touchscreen 1406 with positions of the passcode entry interface 1402 and the storefront interface element 1404 alternated. The second screenshot 1401B illustrates a second user session of the payment checkout application. As shown, the electronic device 1400 alternates the positions of the passcode entry interface 1402 and the storefront interface element 1404 from the first user session to the second user session. This is advantageous in distributing fingerprints on the touchscreen 1406 from one user session to another, says preventing someone from reverse engineering the passcode entry through fingerprint analysis.

Figure 15A:
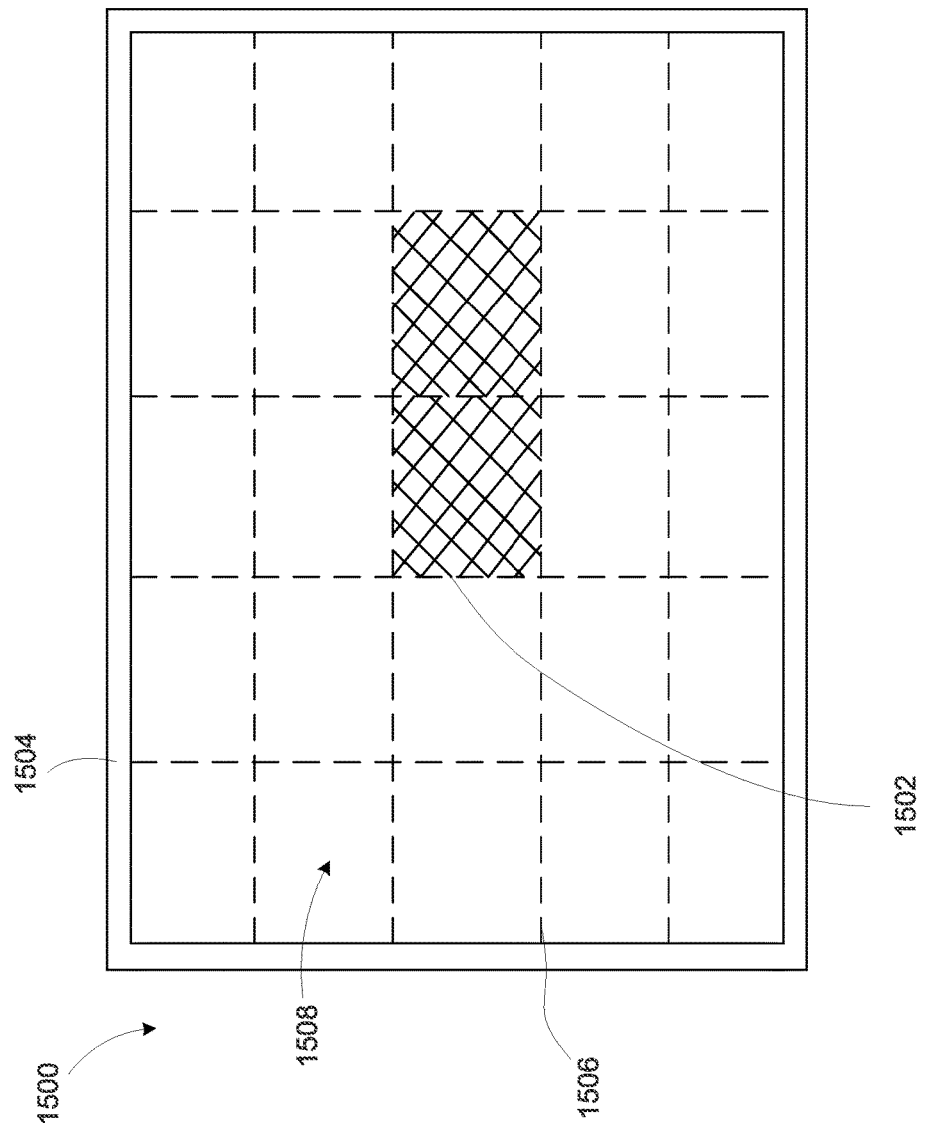
FIG. 15A illustrates an electronic device identifying a finger touch traffic region on a touchscreen.

This technique of alternating positions of the passcode entry interface 1402 and a second interface may be apply outside of the context of the storefront interface elements 1404. That is, this technique may apply to any application where the second interface is presented on the same touchscreen 1406 during a user session of operating the application. The alternating of positions may applies to any other time periods other than user sessions, such as periodically or conditional on a number of touch events recorded on the touchscreen 1406. The passcode entry interface 1402 may be in accordance with various embodiments described herein, such as passcode entry interfaces with various button arrangements, positioning, geometries, adornments, and/or interaction mechanisms FIG. 15A illustrates an electronic device 1500 identifying a finger touch traffic region 1502 on a touchscreen 1504, such as the touchscreen 114. The electronic device 1500 may represent the electronic device 102 or the electronic device 200. The finger touch traffic region 1502 may be determined by the passcode interface module 202. For example, the electronic device 1500 can keep track of touch events on the touchscreen 1504. The touch events may be in response to a passcode entry interface or any other interface displayed on the touchscreen 1504. The touch events can be stored on a grid structure 1506. A touch event detected within a cell 1508 of the grid structure 1506 can increase a touch event count of the cell 1508. In various embodiments, when the cell 1508 exceeds a threshold number of touch events, the cell 1508 can be considered part of the finger touch traffic region 1502. In other embodiments, when the cell 1508 both exceeds a threshold number of touch events and has a rank within a rank threshold as compared to other cells, then the cell 1508 can be considered part of the finger touch traffic region 1502.

In various embodiments, the electronic device 1500 can track one or more instances of finger touch traffic regions 1502. The cell 1508 may be configured as a square, a rectangle, or other geometric shapes. Likewise, the finger touch traffic region 1502 may be configured as a square, a rectangle, or other geometric shapes.

Figure 15B:
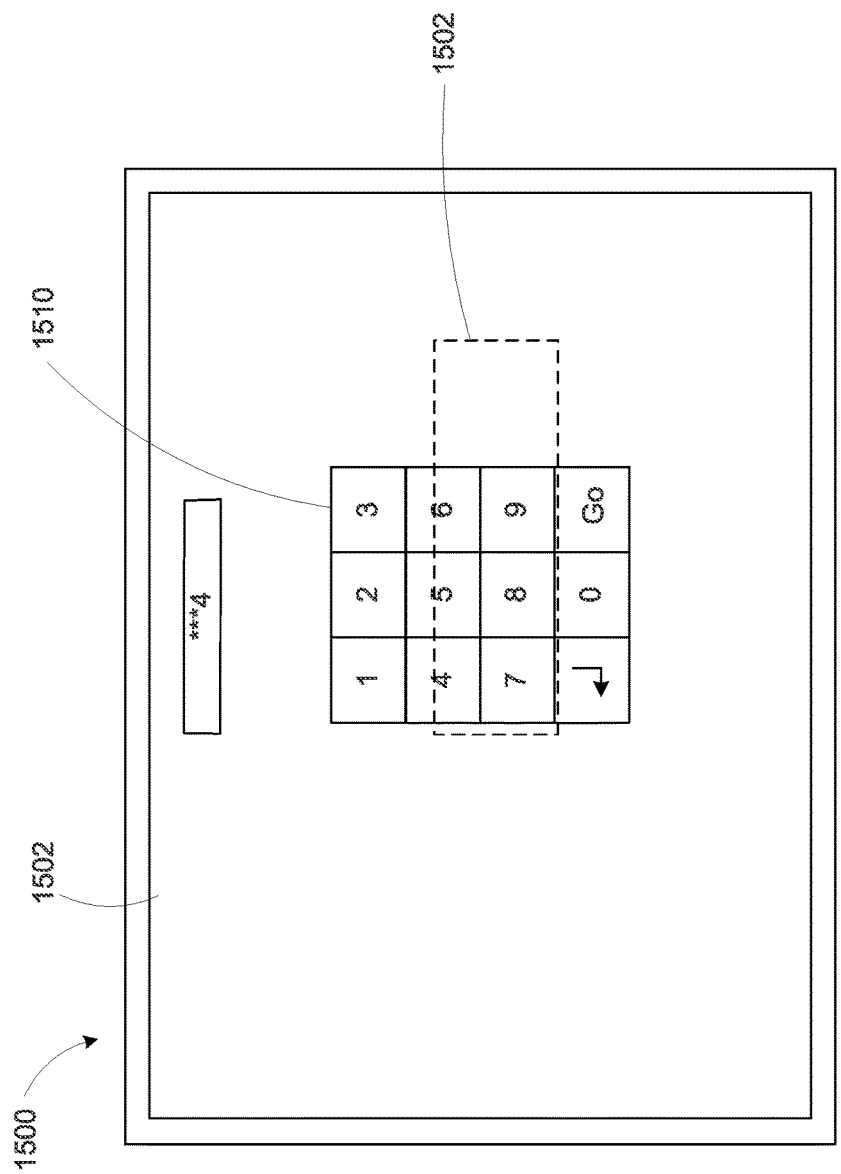
FIG. 15B illustrates the electronic device of FIG. 15A positioning a passcode entry interface over the finger touch traffic region.
Figure 16:
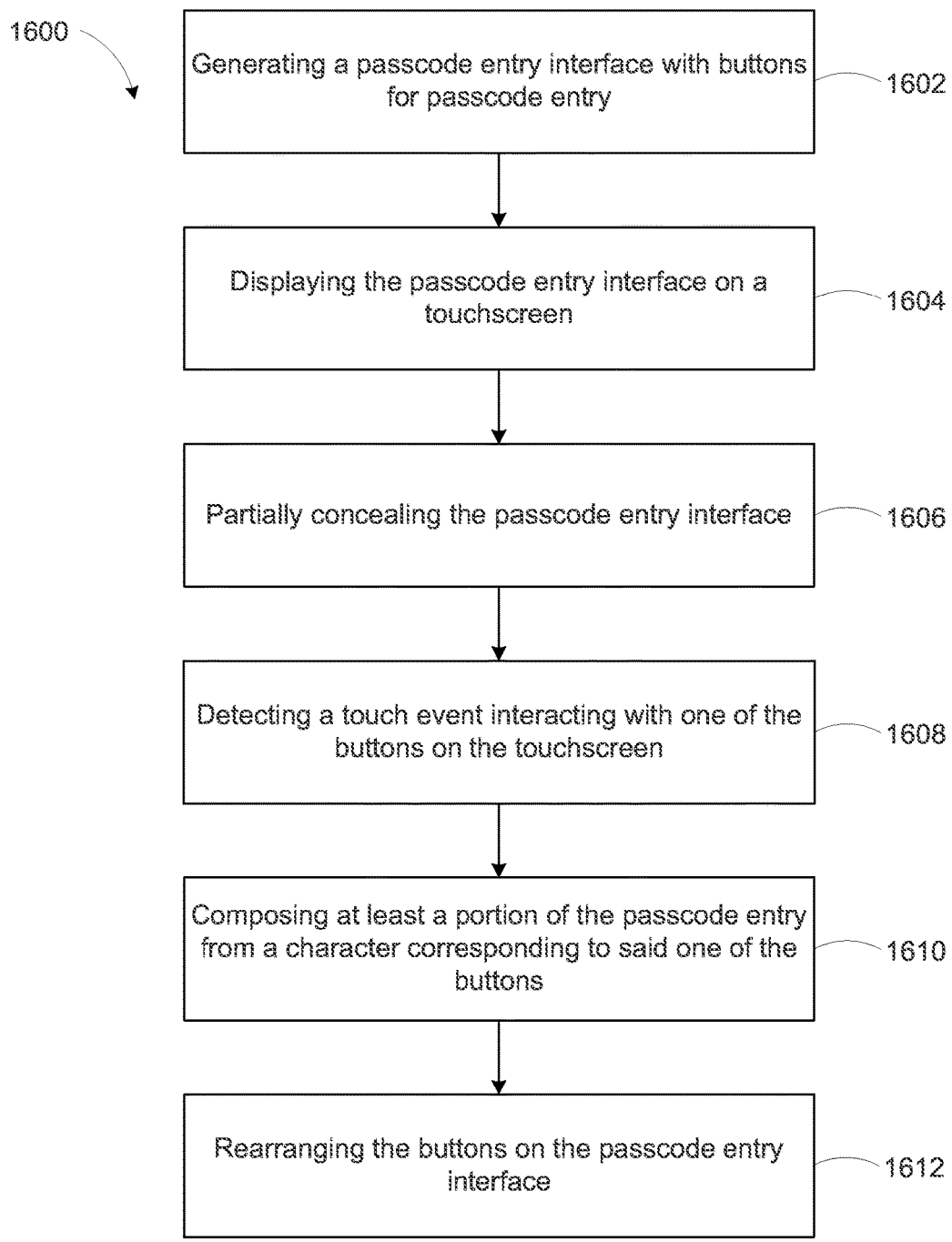
FIG. 16 is a flow chart of a process of operating an electronic device for passcode entry security.

FIG. 15B illustrates the electronic device 1500 of FIG. 15A positioning a passcode entry interface 1510, such as the passcode entry interface 112, over the finger touch traffic region 1502. The passcode entry interface 1510 may be generated and maintained by the passcode interface module 202. As shown, the passcode interface module 202 may be positioned over the finger touch traffic region 1502 as identified by the electronic device 1500 shown in FIG. 15A. In various embodiments, when the passcode entry interface 1510 does not fit in the finger touch traffic region 1502, the passcode entry interface 1510 may be positioned to maximize overlap between the finger touch traffic region 1502 and the passcode entry interface 1510. The passcode entry interface 1510 may be in accordance with various embodiments described herein, such as passcode entry interfaces with various button arrangements, positioning, geometries, adornments, and/or interaction mechanisms FIG. 16 is a flow chart of a process 1600 of operating an electronic device, such as the electronic device 102 of FIG. 1 or the electronic device 200 of FIG. 2, for passcode entry security. The electronic device generates a passcode entry interface including buttons at step 1602. The buttons may be scrambled out of sequence. The buttons correspond to and are labeled with individual characters for composing a passcode entry. The passcode entry interface may be generated by randomly arranging the buttons of the passcode entry interface. The buttons can be randomly arranged while keeping the outline shape of the passcode entry interface constant. Step 1602 may be performed by the passcode interface module 202.

In some embodiments, the electronic device generates the passcode entry interface in a loop pattern, such as a ring shape. An initial state of every instance of the passcode entry interface may include a random rotation. This is advantageous in that an overlooking attacker cannot reverse engineer a character entry by looking at the location of where a user interacts with the passcode entry interface.

As part of step 1602 or as a separate step 1604, the electronic device displays the passcode entry interface on a touchscreen of the electronic device. When displaying the passcode entry interface, the electronic device can position the passcode entry interface at a corner of the touchscreen to enable a user to cover a passcode entry with his or her hand. Step 1604 may be performed by the passcode interface module 202.

Optionally, the electronic device can conceal the passcode entry interface by visually obstructing displaying of the buttons at step 1606. For example, the electronic device can vary pixel densities (e.g., the stroke widths) within each of the characters to make the characters difficult to read at a distance. As another example, the electronic device can overlay a concealment layer over the passcode entry interface. The concealment layer may include a spray of visual obstructions, such as blots, strokes, line segments, dots, stains, or any combination thereof. In yet another example, the electronic device can label the buttons with the individual characters obscured by a first line moiré pattern. A shape with a second line moiré pattern can slide over the passcode entry interface revealing each character thereunder.

The user may interact with the passcode entry interface on the touchscreen. Thus, the electronic device can detect a touch event interacting with at least one of the buttons on the touchscreen at step 1608. Step 1608 may be performed by the input device driver 208. In response to the touch event, the electronic device composes at least a portion of the passcode entry from a character corresponding to the button associated with the touch event at step 1610. Step 1610 may be performed by the passcode interface module 202 and/or the communication module 210. Once the user confirms completion of the passcode entry, the passcode entry is then used for verification of the user's identity.

Optionally, in response to the touch event, the electronic device can rearrange the buttons on the passcode entry interface at step 1612. The rearrangement may be a random assignment of the characters to the buttons. The rearrangement may also be random swapping of the characters and the corresponding buttons. Where the passcode entry interface follows a loop pattern, the rearranging may include a random rotation of the buttons. In some embodiments, the buttons are rearranged without changing relative positions between pairs of the buttons. In various embodiments, the shape of the passcode entry interface remains constant during the rearranging.

Figure 17:
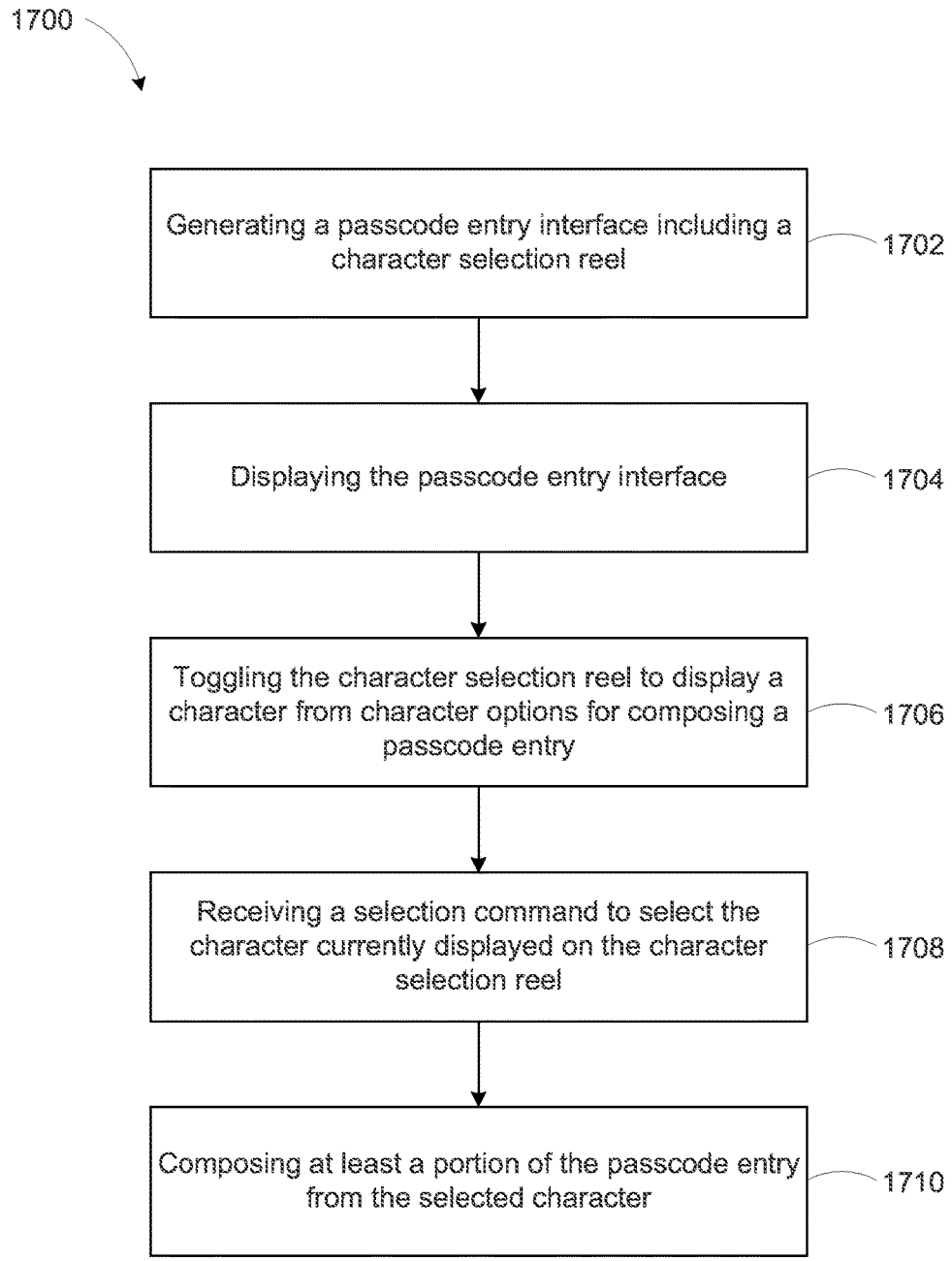
FIG. 17 is a flow chart of a process of operating an electronic device for passcode entry through a character selection reel.

FIG. 17 is a flow chart of a process 1700 of operating an electronic device, such as the electronic device 102 of FIG. 1 or the electronic device 200 of FIG. 2, for passcode entry through a character selection reel. The electronic device generates a passcode entry interface including at least a character selection reel at step 1702. The passcode entry interface may include multiple character selection reels. The character selection reel is configured to toggle amongst different character options for composing a passcode entry. Step 1702 may be performed by the passcode interface module 202.

Next, at step 1704, the electronic device displays the passcode entry interface on a touchscreen of the electronic device. When displaying the passcode entry interface, the electronic device can position the passcode entry interface at a corner of the touchscreen to enable a user to cover a passcode entry with his or her hand. Step 1704 may be performed by the passcode interface module 202.

The user may interact with the character selection reel of the passcode entry interface on the touchscreen or from a hardware mechanism on a docking station, such as the docking station 106 of FIG. 1, coupled to the electronic device. In response to such user input, the electronic device toggles the character selection reel to display a character from amongst the character options for composing a passcode entry at step 1706. The electronic device can detect a user input, for example, by detecting a spin gesture over a dial element of the user interface on the touchscreen. As another example, the electronic device can detect a user input by detecting a swipe gesture over the character selection reel. As yet another example, the electronic device can detect a user input when the electronic device receives a toggle command from a docking station, such as the docking station 106 of FIG. 1, detachably coupled to the electronic device. Step 1706 may be performed by the input device driver 208.

Next, the electronic device can receive a selection command via a user input to select the character currently displayed on the character selection reel at step 1708. The selection command may be based on pressing of a button element on the touchscreen. The selection command may also be received from the docking station detachably coupled to the electronic device. Step 1708 may be performed by the input device driver 208.

In response to the selection command, the electronic device composes at least a portion of the passcode entry from the selected character at step 1710. Step 1710 may be performed by the passcode interface module 202 and/or the communication module 210. Once the user confirms completion of the passcode entry, the passcode entry is then used for verification of the user's identity.

Figure 18:
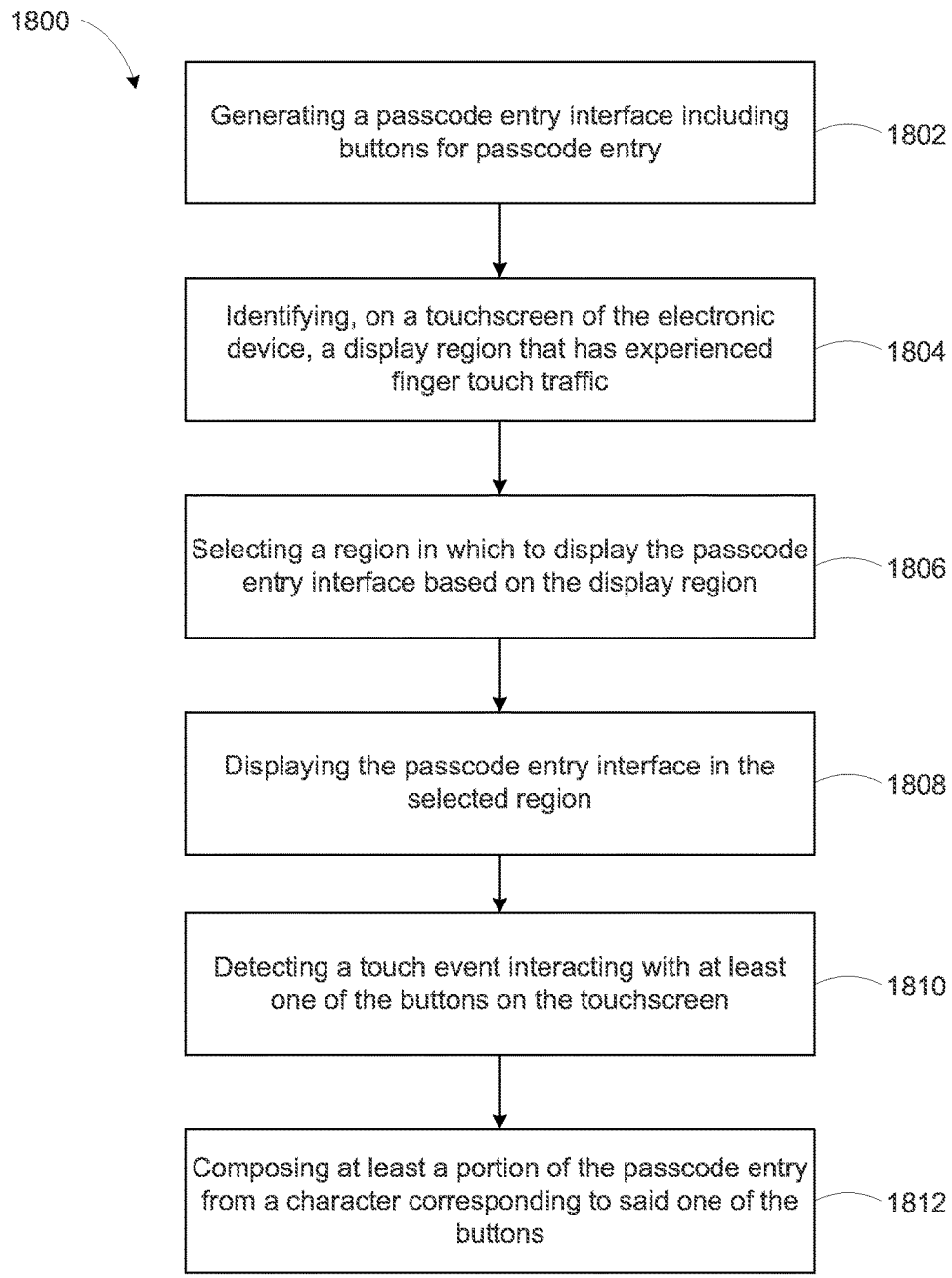
FIG. 18 is a flow chart of a process of operating an electronic device for positioning a passcode entry interface based on finger touch traffic.

FIG. 18 is a flow chart of a process 1800 of operating an electronic device, such as the electronic device 102 of FIG. 1 or the electronic device 200 of FIG. 2, for positioning a passcode entry interface based on finger touch traffic. The electronic device generates a passcode entry interface including buttons at step 1802. The buttons may be scrambled out of sequence. The buttons correspond to and are labeled with individual characters for composing a passcode entry. Step 1802 may be performed by the passcode interface module 202.

Next, the electronic device identifies a traffic region on a touchscreen, such as the touchscreen 114 of FIG. 1, of the electronic device with pre-existing finger touch traffic at step 1804. The traffic region is a portion on the touch screen that has previously experienced finger touch traffic. Identification of the traffic region with pre-existing finger touch traffic may be based on a touch event history. The touch event history is a record of touch events representing user interactions with an interface (e.g., another instance of the passcode entry interface or another interface displayed prior to the passcode entry interface) displayed on the touchscreen. When a second interface has previously been displayed on the touchscreen, the traffic region of pre-existing finger touch traffic may be identified based on a position of where the second interface was previously displayed. In some embodiments, positions of interface elements (e.g., menu items) of the second interface are randomized to distribute finger touch traffic. Once the traffic region is identified, the electronic device selects a region in which to display the passcode entry interfaced based on the traffic region that has experienced finger touch traffic at step 1806. Step 1804 and step 1806 may be performed by the passcode interface module 202.

Next, at step 1808, the electronic device displays the passcode entry in the selected region with pre-existing finger touch traffic. In some embodiments, the passcode entry interface is displayed over where the second interface was previously displayed. This way, positions of the passcode entry interface and the second interface are swapped from one user session to another. Step 1808 may be performed by the passcode interface module 202.

The user may interact with the passcode entry interface on the touchscreen. Thus, the electronic device can detect a touch event interacting with at least one of the buttons on the touchscreen at step 1810. Step 1810 may be performed by the input device driver 208. In response to the touch event, the electronic device composes at least a portion of the passcode entry from a character corresponding to the button associated with the touch event at step 1812. Step 1812 may be performed by the passcode interface module 202 and/or the communication module 210. Once the user confirms completion of the passcode entry, the passcode entry is then used for verification of the user's identity.

Regarding the processes 1600, 1700 and 1800, while the various steps, blocks or sub-processes are presented in a given order, alternative embodiments may perform routines having steps, or employ systems having steps, blocks or sub-processes, in a different order, and some steps, sub-processes or blocks may be deleted, moved, added, subdivided, combined, and/or modified to provide alternative or subcombinations. Each of these steps, blocks or sub-processes may be implemented in a variety of different ways. Also, while steps, sub-processes or blocks are at times shown as being performed in series, some steps, sub-processes or blocks may instead be performed in parallel, or may be performed at different times as will be recognized by a person of ordinary skill in the art. Further any specific numbers noted herein are only examples: alternative implementations may employ differing values or ranges.

Figure 19:
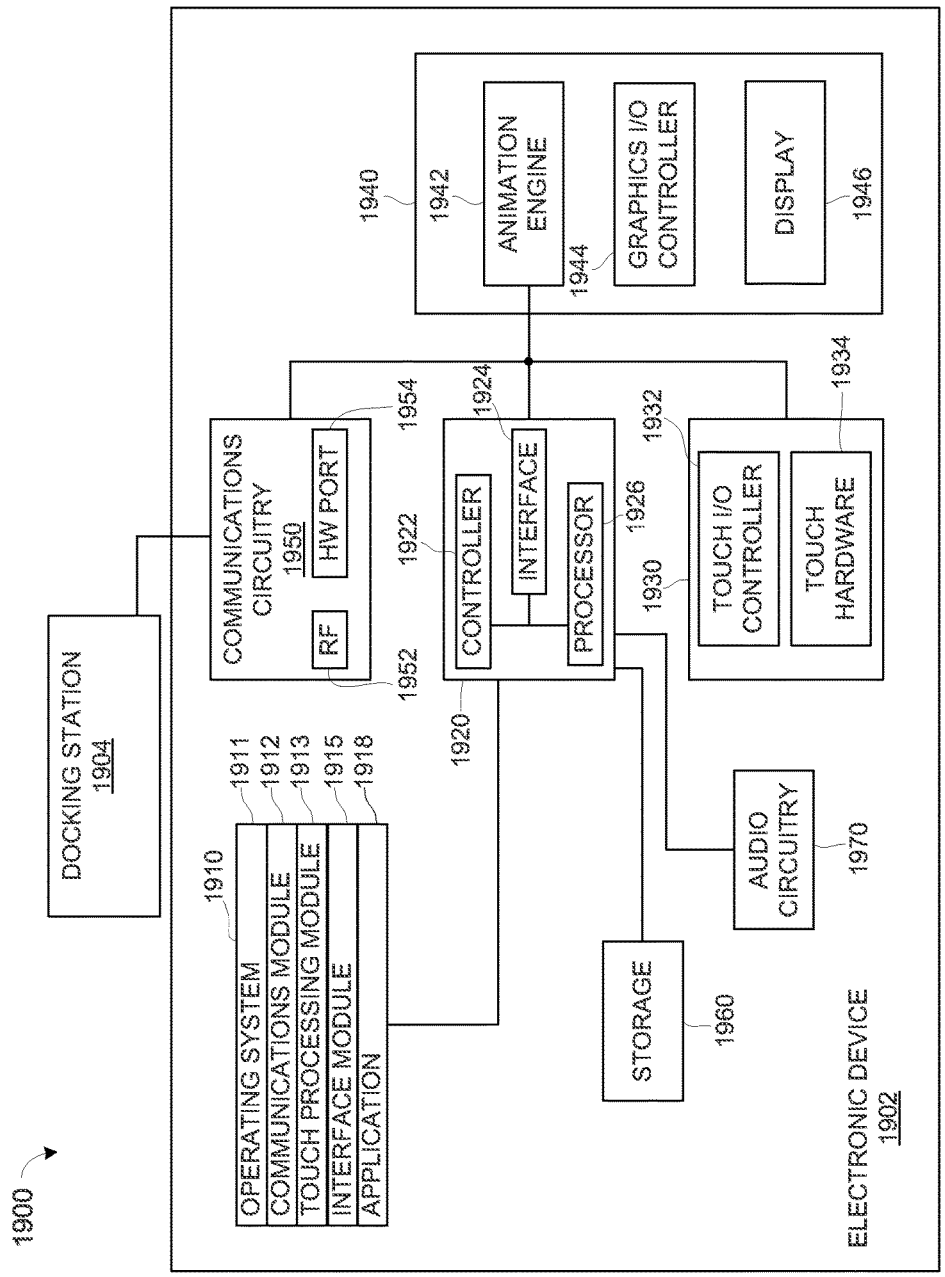
FIG. 19 is a block diagram of a passcode entry system including an electronic device and a docking station.

FIG. 19 is a block diagram of a passcode entry system 1900 including an electronic device 1902 (e.g., the electronic device 200 of FIG. 2) and a docking station 1904 (e.g., the docking station 106 of FIG. 1). Note that the architecture shown in FIG. 19 is only one example of an architecture for a passcode entry system in accordance with the technique introduced here; further, the electronic device 1902 in FIG. 19 could have more or fewer components than shown, or a different configuration of components. The various components shown in FIG. 19 can be implemented by using hardware, software, firmware or a combination thereof, including one or more signal processing and/or application specific integrated circuits.

The electronic device 1902 that can include one or more computer-readable mediums 1910, processing system 1920, touch subsystem 1930, display/graphics subsystem 1940, communications circuitry 1950, storage 1960, and audio circuitry 1970. These components may be coupled by one or more communication buses or other signal lines. The electronic device 1902 can be the same as or similar to the electronic device 102, the electronic device 200, or the electronic device 400.

The communications circuitry 1950 can include RF circuitry 1952 and/or port 1954 for sending and receiving information. The RF circuitry 1952 permits transmission of information over a wireless link or network to one or more other devices and includes well-known circuitry for performing this function. The port 1954 permits transmission of information over a wired link. The communications circuitry 1950 can communicate, for example, with the docking station 1904 or an external system for verifying the passcode entry. The communications circuitry 1950 can be coupled to the processing system 1920 via a peripherals interface 1924. The peripherals interface 1924 can include various known components for establishing and maintaining communication between peripherals and the processing system 1920.

The audio circuitry 1970 can be coupled to an audio speaker (not shown), a microphone (not shown), an electronic card reader (not shown), or any combination thereof and includes known circuitry for processing voice signals received from the peripherals interface 1924 to enable a user to communicate in real-time with other users. In some embodiments, the audio circuitry 1970 includes a headphone jack (not shown).

The peripherals interface 1924 can couple various peripherals, such as an electronic card reader, of the system to one or more processors 1926 and the computer-readable medium 1910. The one or more processors 1926 can communicate with one or more computer-readable mediums 1910 via a controller 1922. The computer-readable medium 1910 can be any device or medium that can store code and/or data for use by the one or more processors 1926. The medium 1910 can include a memory hierarchy, including but not limited to cache, main memory and secondary memory. The memory hierarchy can be implemented using any combination of RAM (e.g., SRAM, DRAM, DDRAM), ROM, FLASH, magnetic and/or optical storage devices, such as disk drives, magnetic tape, CDs (compact disks) and DVDs (digital video discs). The medium 1910 may also include a transmission medium for carrying information-bearing signals indicative of computer instructions or data (with or without a carrier wave upon which the signals are modulated). For example, the transmission medium may include a communications network, including but not limited to the Internet, intranet(s), Local Area Networks (LANs), Wide Local Area Networks (WLANs), Storage Area Networks (SANs), Metropolitan Area Networks (MAN) and the like.

The one or more processors 1926 can run various software components stored in the medium 1910 to perform various functions for the electronic device 1902. Note that the order of the modules in the medium 1910 does not necessarily denote the order of layers of a software stack as implemented in the medium 1910. In some embodiments, the software components include an operating system 1911, a communication module (or set of instructions) 1912, a touch processing module (or set of instructions) 1912, an interface module (or set of instructions) 1915, such as the passcode interface module 202 of FIG. 2, and one or more applications (or set of instructions) 1918. Each of these modules and above noted applications correspond to a set of instructions for performing one or more functions described above and the methods described in this application (e.g., the computer-implemented methods and other information processing methods described herein). These modules (e.g., sets of instructions) need not be implemented as separate software programs, procedures or modules, and thus various subsets of these modules may be combined or otherwise rearranged in various embodiments. In some embodiments, the medium 1910 may store a subset of the modules and data structures identified above. Furthermore, the medium 1910 may store additional modules and data structures not described above.

The operating system 1911 can include various procedures, sets of instructions, software components and/or drivers for controlling and managing general system tasks (e.g., memory management, storage device control, power management, etc.) and facilitates communication between various hardware and software components.

The communication module 1912 facilitates communication with other devices using the communications circuitry 1950 and includes various software components for handling data received from the RF circuitry 1952 and/or the port 1954.

The touch processing module 1913 includes various software components for performing various tasks associated with touch hardware 1934 including but not limited to receiving and processing touch input received from the I/O device 1930 via a touch I/O device controller 1932. For example, the touch processing module 1913 can also include software components for performing tasks associated with other I/O devices (not shown).

The interface module 1915 is configured to present and maintain a passcode interface for a user to enter a passcode to authenticate the user's identity. The interface module 1915 can include various known software components for rendering, animating and displaying graphical objects on a display surface. In embodiments, in which the touch hardware 1934 is a touch sensitive display (e.g., touch screen), the interface module 1915 includes components for rendering, displaying, and animating objects on the touch sensitive display. The interface module 1915 can provide animation instructions to an animation engine 1942, which can render the graphics and provide the rendering to graphics I/O controller 1944, so that the graphics I/O controller 1944 can display the graphics on display 1946. The interface module 1915 can further control the audio circuitry 1970 to provide an auditory component to the passcode interface.

One or more applications 1918 can include any applications installed on the electronic device 1902, including without limitation, modules of the electronic device 200, a browser, keyboard emulation, widgets, JAVA-enabled applications, encryption, digital rights management, voice recognition, voice replication, location determination capability (such as that provided by the global positioning system (GPS)), etc.

The touch I/O controller 1932 is coupled to the touch hardware 1934 for controlling or performing various functions. The touch hardware 1932 communicates with the processing system 1920 via the touch I/O device controller 1932, which includes various components for processing user touch input (e.g., scanning hardware). One or more other input controllers (not shown) receives/sends electrical signals from/to other I/O devices (not shown). Other I/O devices may include physical buttons, dials, slider switches, sticks, keyboards, touch pads, additional display screens, or any combination thereof.

If embodied as a touch screen, the touch hardware 1934 displays visual output to the user in a GUI. The visual output may include text, graphics, video, and any combination thereof. Some or all of the visual output may correspond to user-interface objects. The touch hardware 1934 forms a touch-sensitive surface that accepts touch input from the user. The touch hardware 1934 and the touch controller 1932 (along with any associated modules and/or sets of instructions in the medium 1910) detects and tracks touches or near touches (and any movement or release of the touch) on the touch hardware 1934 and converts the detected touch input into interaction with graphical objects, such as one or more user-interface objects. In the case in which the touch hardware 1934 and the display 1925 are embodied as a touch screen, the user can directly interact with graphical objects that are displayed on the touch screen. Alternatively, in the case in which hardware 1934 is embodied as a touch device other than a touch screen (e.g., a touch pad), the user may indirectly interact with graphical objects that are displayed on a separate display screen.

Embodiments in which the touch hardware 1934 is a touch screen, the touch screen may use LCD (liquid crystal display) technology, LPD (light emitting polymer display) technology, OLED (organic light emitting diode), or OEL (organic electro luminescence), although other display technologies may be used in other embodiments.

Feedback may be provided by the touch hardware 1934 based on the user's touch input as well as a state or states of what is being displayed and/or of the computing system. Feedback may be transmitted optically (e.g., light signal or displayed image), mechanically (e.g., haptic feedback, touch feedback, force feedback, or the like), electrically (e.g., electrical stimulation), olfactory, acoustically (e.g., beep or the like), or the like or any combination thereof and in a variable or non-variable manner.

In some embodiments, the peripherals interface 1924, the one or more processors 1926, and the memory controller 1922 may be implemented on a single chip. In some other embodiments, they may be implemented on separate chips. The storage 1960 can any suitable medium for storing data, including, for example, volatile memory (e.g., cache, RAM), non-volatile memory (e.g., Flash, hard-disk drive), or a both for storing data, including pages used for transition animations.

What is claimed is:

1. A method of operating a mobile device, the method comprising:

initializing a financial transaction between a consumer and a merchant, in response to detecting a card read event of a payment card on a card reader station that is detachably coupled to the mobile device;

determining a configuration of a personal identification number (PIN) entry interface for a user to input a PIN entry, wherein the PIN entry interface includes a character selection reel displaying a character and capable of switching amongst a set of characters that the user can select from to compose the PIN entry, wherein the configuration includes a first initial character to be displayed on the PIN entry interface, and wherein a user input to a physical mechanism integral to the card reader station causes the character selection reel to switch which character, from amongst the set of characters, to display;

sending the configuration of the PIN entry interface from the mobile device to the card reader station to cause the card reader station to display the PIN entry interface on a display device integral to the card reader station;

receiving, sequentially from a selection mechanism integral to the card reader station, a plurality of selection commands, wherein each selection command is received when the character is displayed on the character selection reel, wherein the selection mechanism is one of a dial, a button integral to the card reader station, or a touch screen of the display device integral to the card reader station, wherein the receiving the plurality of selection commands comprises at least one of:

receiving the selection command in response to a user input to the dial;

receiving the selection command when a touch event is detected on the touch screen of the display device integral to the card reader station as the selection mechanism; or receiving the selection command when a button press is detected via the button integral to the card reader station as the selection mechanism;

determining the PIN entry based at least in part on the sequence of selection commands received from the card reader station and a record of a character displayed when each of the selection commands was received; and initiating a process to authenticate the financial transaction based at least in part on the PIN entry.

2. The method of claim 1, wherein generating the PIN entry interface includes selecting the first initial character at random from the set of characters for displaying on the character selection reel.

3. The method of claim 1, wherein said determining includes generating a new instance of the character selection reel with a second initial character different than a prior instance of the character selection reel having the first initial character, in response to receiving a selection command from the user; wherein said sending includes sending a second configuration of the new instance of the character selection reel to the card reader station.

4. The method of claim 1, further comprising displaying, on the display device integral to the card reader station, the character selection reel as a window displaying a single character label.

5. A method of authenticating a financial transaction, the method comprising:

transmitting, by a card reader station detachably coupled to a mobile device, a message to the mobile device indicating a card read event via the card reader station to cause the mobile device to initialize a financial transaction between a consumer and a merchant;

receiving, from the mobile device, a configuration of a passcode entry interface for a user to input a passcode entry to authenticate the financial transaction, the passcode entry interface being a character selection reel displaying a character and capable of switching amongst a set of characters that the user can select from to compose the passcode entry, and wherein the configuration includes a first initial character to be displayed on the passcode entry interface before the user causes the character selection reel to switch which character, from amongst the set of characters, to display;

displaying the character selection reel on a display device integral to the card reader station;

receiving, via a physical mechanism integral to the card reader station, a user input to cause the character selection reel to change the character displayed;

identifying a target character being displayed on the character selection reel when a character selection command is received via a selection mechanism integral to the card reader station, wherein the selection mechanism is one of a dial, a button integral to the card reader station, or a touch screen of the display device integral to the card reader station, wherein the receiving the character selection command comprises at least one of:

receiving the character selection command in response to a user input to the dial;

receiving the character selection command when a touch event is detected on the touch screen of the display device integral to the card reader station as the selection mechanism; or receiving the character selection command when a button press is detected via the button integral to the card reader station as the selection mechanism; and sending the target character to be composed as part of the passcode entry entered by the user to facilitate authentication of the financial transaction.

6. The method of claim 5, further comprising:

detecting a swipe of a payment card on the card reader station; and in response to detecting the swipe, initializing the financial transaction between a consumer and a merchant to the mobile device.

7. The method of claim 5, further comprising displaying motion of the character selection reel to display the target character different from the initial character.

8. The method of claim 5, further comprising displaying motion of the character selection reel by changing the target character displayed on the character selection reel when the physical mechanism integral to the card reader station is operated.

9. The method of claim 5, further comprising:

displaying motion of the character selection reel by changing the target character displayed on the character selection reel when the physical mechanism integral to the card reader station is operated.

10. The method of claim 5, further comprising displaying the motion of the character selection reel by changing the target character displayed on the character selection reel when a dial included in the physical mechanism integral to the card reader station is turned, wherein the dial surrounds the display device integral to the card reader station.

11. A method comprising:

transmitting, by a card reader station detachably coupled to a mobile device, a message to the mobile device indicating a card read event via the card reader station to cause the mobile device to initialize a financial transaction between a consumer and a merchant;

receiving, from the mobile device, a configuration of a passcode entry interface for a user to input a passcode entry to authenticate the financial transaction, the passcode entry interface being a character selection reel displaying a character and capable of switching amongst a set of characters that the user can select from to compose the passcode entry, and wherein the configuration includes a first initial character to be displayed on the passcode entry interface before the user causes the character selection reel to switch which character, from amongst the set of characters, to display;

displaying the character selection reel on a display device integral to the card reader station;

receiving, via a physical mechanism integral to the card reader station, a user input to cause the character selection reel to change the character displayed on the display device;

receiving an indication of a character selection from a selection mechanism integral to the card reader station, wherein the selection mechanism is one of a dial, a button integral to the card reader station, or a touch screen of the display device integral to the card reader station, wherein the receiving the indication of the character selection comprises at least one of:

receiving the indication of the character selection in response to a user input to the dial;

receiving the indication of the character selection when a touch event is detected on the touch screen of the display device integral to the card reader station as the selection mechanism; or receiving the indication of the character selection when a button press is detected via the button integral to the card reader station as the selection mechanism;

determining a target character displayed on the character selection reel corresponding to the indication of the character selection received from the selection mechanism integral to the card reader station; and determining the passcode entry based at least in part on the indication of the character selection from the selection mechanism and a record of a character displayed when the indication of the character selection was received.

12. The method of claim 11, further comprising presenting feedback during entry of the passcode in a feedback window integral to the card reader station.

13. The method of claim 11, further comprising displaying, on the display device integral to the card reader station, the character selection reel as a window displaying a single character label.

* * * * *